(12) United States Patent
Fletcher et al.

(10) Patent No.: US 10,239,187 B2
(45) Date of Patent: Mar. 26, 2019

(54) METHODS FOR POST-MOLD PROCESSING A VENTURI DEVICE OR CHECK VALVE

(71) Applicants: David E. Fletcher, Flint, MI (US); Matthew C. Gilmer, Whitmore Lake, MI (US); Keith Hampton, Ann Arbor, MI (US); Andrew D. Niedert, New Hudson, MI (US)

(72) Inventors: David E. Fletcher, Flint, MI (US); Matthew C. Gilmer, Whitmore Lake, MI (US); Keith Hampton, Ann Arbor, MI (US); Andrew D. Niedert, New Hudson, MI (US)

(73) Assignee: Dayco IP Holdings, LLC, Troy, MI (US)

( * ) Notice: Subject to any disclaimer, the term of this patent is extended or adjusted under 35 U.S.C. 154(b) by 0 days.

(21) Appl. No.: 15/189,922

(22) Filed: Jun. 22, 2016

(65) Prior Publication Data

US 2016/0375548 A1 Dec. 29, 2016

Related U.S. Application Data

(60) Provisional application No. 62/183,471, filed on Jun. 23, 2015.

(51) Int. Cl.
*B24C 3/32* (2006.01)
*B24C 11/00* (2006.01)
(Continued)

(52) U.S. Cl.
CPC ............. *B24C 3/325* (2013.01); *B24C 11/00* (2013.01); *B29C 37/02* (2013.01); *B29L 2031/7506* (2013.01)

(58) Field of Classification Search
None
See application file for complete search history.

(56) References Cited

U.S. PATENT DOCUMENTS

| 1,845,969 A | 2/1932 | Hueber |
| 2,739,424 A * | 3/1956 | Fritze ..................... B24C 3/325 |
| | | 118/300 |

(Continued)

FOREIGN PATENT DOCUMENTS

| DE | 4310761 | 10/1994 |
| GB | 2129516 | 5/1984 |

(Continued)

OTHER PUBLICATIONS

EP, Supplementary European Search Report; Patent Application No. 14811266.7; 5 pages (dated Apr. 5, 2017).

(Continued)

*Primary Examiner* — Joseph J Hail
*Assistant Examiner* — Brian D Keller
(74) *Attorney, Agent, or Firm* — FisherBroyles, LLP; Susan M. Oiler

(57) ABSTRACT

Methods for post-mold processing a Venturi device for generating vacuum are disclosed that improve the evacuation time thereof. The methods include providing a molded Venturi device having a body defining a Venturi gap between an outlet end of a converging motive passageway and an inlet end of a diverging discharge passageway, where the outlet end defines a motive exit having flash extending radially inward and the inlet end defines a discharge inlet having flash extending radially inward. Then, the method includes positioning the molded Venturi device with an inlet end of the converging motive passageway facing a blasting nozzle or with an outlet end of a diverging discharge passageway facing a blasting nozzle, and propelling blasting media into the motive inlet or the discharge exit of the Venturi device to remove the flash in the motive exit and in the discharge inlet, or vice versa.

18 Claims, 19 Drawing Sheets

(51) Int. Cl.
*B29C 37/02* (2006.01)
*B29L 31/00* (2006.01)

(56) References Cited

U.S. PATENT DOCUMENTS

| | | | |
|---|---|---|---|
| 3,234,932 A | | 2/1966 | Bird et al. |
| 3,754,841 A | | 8/1973 | Grabb et al. |
| 4,115,960 A | * | 9/1978 | Zecher ............... B24C 3/26 134/134 |
| 4,211,200 A | | 7/1980 | Rocchio et al. |
| 4,389,820 A | * | 6/1983 | Fong ............... B01F 3/0092 451/39 |
| 4,499,034 A | | 2/1985 | McAllister |
| 4,519,423 A | * | 5/1985 | Ho ............... B01F 5/045 137/888 |
| 4,554,786 A | | 11/1985 | Takeuchi et al. |
| 4,575,396 A | | 3/1986 | Matsumoto et al. |
| 5,063,015 A | | 11/1991 | Lloyd et al. |
| 5,108,266 A | | 4/1992 | Hewitt |
| 5,188,141 A | | 2/1993 | Cook et al. |
| 5,265,383 A | | 11/1993 | Shank, Jr. |
| 5,291,916 A | * | 3/1994 | Kloosterman ......... B60T 17/02 137/112 |
| 5,325,638 A | | 7/1994 | Lynn |
| 5,575,705 A | | 11/1996 | Yam et al. |
| 5,588,901 A | | 12/1996 | Rubey, III et al. |
| 5,704,825 A | | 1/1998 | LeCompte |
| 5,816,446 A | | 10/1998 | Steindorf et al. |
| 5,827,114 A | | 10/1998 | Yam et al. |
| 5,895,313 A | * | 4/1999 | Ikezaki ............... B24C 1/083 451/38 |
| 6,035,881 A | | 3/2000 | Emmerich et al. |
| RE37,090 E | | 3/2001 | Kloosterman et al. |
| 6,220,271 B1 | | 4/2001 | Emmerich et al. |
| 6,350,185 B1 | | 2/2002 | Robins et al. |
| 7,722,132 B2 | | 5/2010 | Carlsson |
| 8,061,296 B1 | * | 11/2011 | Batur ............... B05B 13/0654 118/306 |
| 9,827,963 B2 | | 11/2017 | Fletcher et al. |
| 2002/0072306 A1 | * | 6/2002 | Carpenter ............... B24C 3/088 451/35 |
| 2003/0232577 A1 | | 12/2003 | Ashizawa |
| 2006/0016477 A1 | | 1/2006 | Zaparackas |
| 2008/0007113 A1 | | 1/2008 | Choi |
| 2008/0121480 A1 | | 5/2008 | Kawamori et al. |
| 2011/0132311 A1 | | 6/2011 | Pursifull et al. |
| 2011/0186151 A1 | | 8/2011 | Sparazynski |
| 2013/0213510 A1 | | 8/2013 | Burnham et al. |
| 2013/0233276 A1 | | 9/2013 | Pursifull et al. |
| 2013/0233287 A1 | | 9/2013 | Leone |
| 2014/0360607 A1 | | 12/2014 | Fletcher et al. |

FOREIGN PATENT DOCUMENTS

| | | |
|---|---|---|
| JP | 2001-295800 | 10/2001 |
| WO | 97/49525 | 12/1997 |
| WO | 02/30621 | 4/2002 |
| WO | 03/057408 | 7/2003 |
| WO | 2007/117529 | 10/2007 |

OTHER PUBLICATIONS

PCT, International Search Report and Written Opinion, Application No. PCT/US2014/041250 (dated Oct. 27, 2014).
PCT, International Search Report and Written Opinion, Application No. PCT/US2016/038798 (dated Sep. 8, 2016).
"Abrasive Blast Nozzles; A Guide to Blasting Nozzle Selection", pp. 1-12; Kennametal Inc. (2012).
"Venturi Blast Nozzles for HDPPB Series Heavy-Duty Portable Pressure Blasters"; http://www.kramerindustriesonline.com/blasting-systems/hdppb-series/accessories/venturi-blast-nozzles.htm pp. 1-2; Kramer Industries, Inc. (at least as early as Jan. 26, 2013).
CN, Office Action and Search Report with English translation; Chinese Patent Application No. 201410413220.7; (dated Nov. 14, 2016).
CN, Second Office Action with English Translation, Chinese Application No. 201410413220.7 dated Jul. 18, 2017 (5 pages).
CN, Third Office Action English Translation; Chinese Application No. 201410413220.7 (dated Jan. 17, 2018).
JP, Non-Final Office Action with English Translation; Japanese Application No. 2016-519556 (dated May 18, 2018).
U.S., First Office Action, U.S. Appl. No. 15/791,561 (dated Jul. 26, 2018).
CN, First Office Action, Chinese Application No. 2016800326925 (dated Nov. 26, 2018).
CN, First Office Action Search Report, Chinese Application No. 2016800326925 (dated Nov. 26, 2018).
EP, Supplemental Search Report with Written Opinion; European Application No. 16815232.0 (dated Jan. 31, 2019).

\* cited by examiner

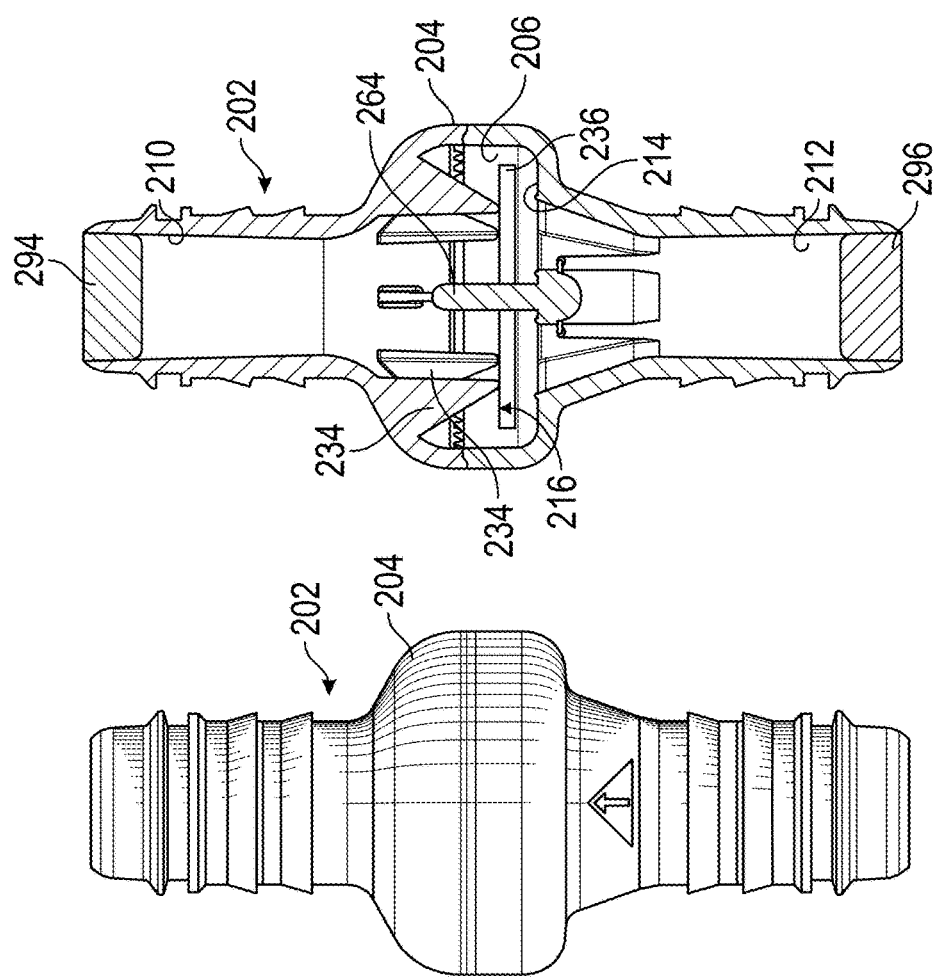

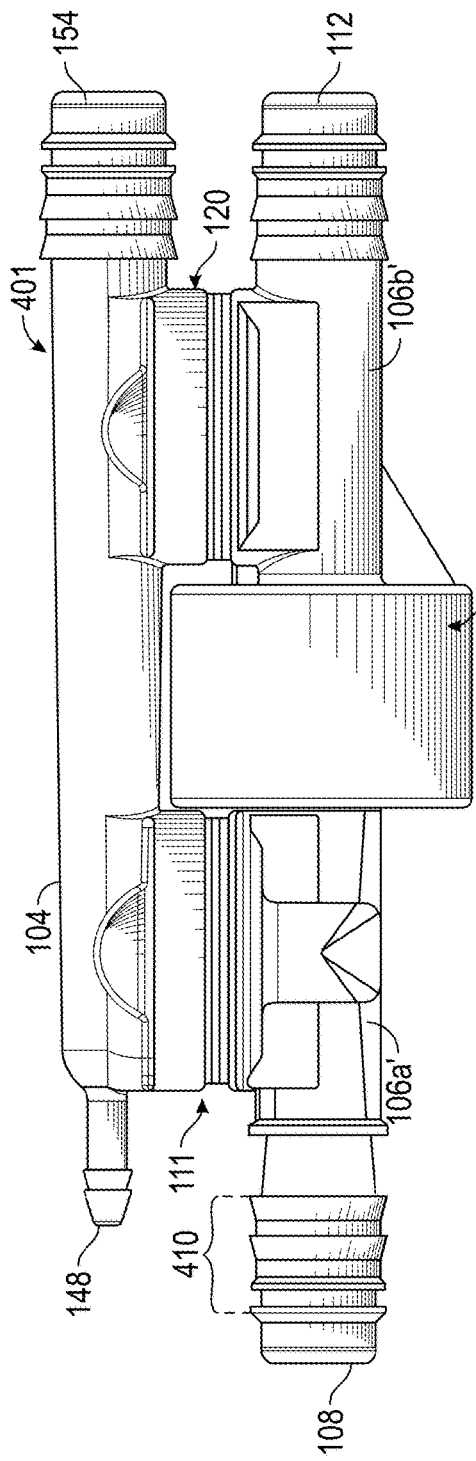
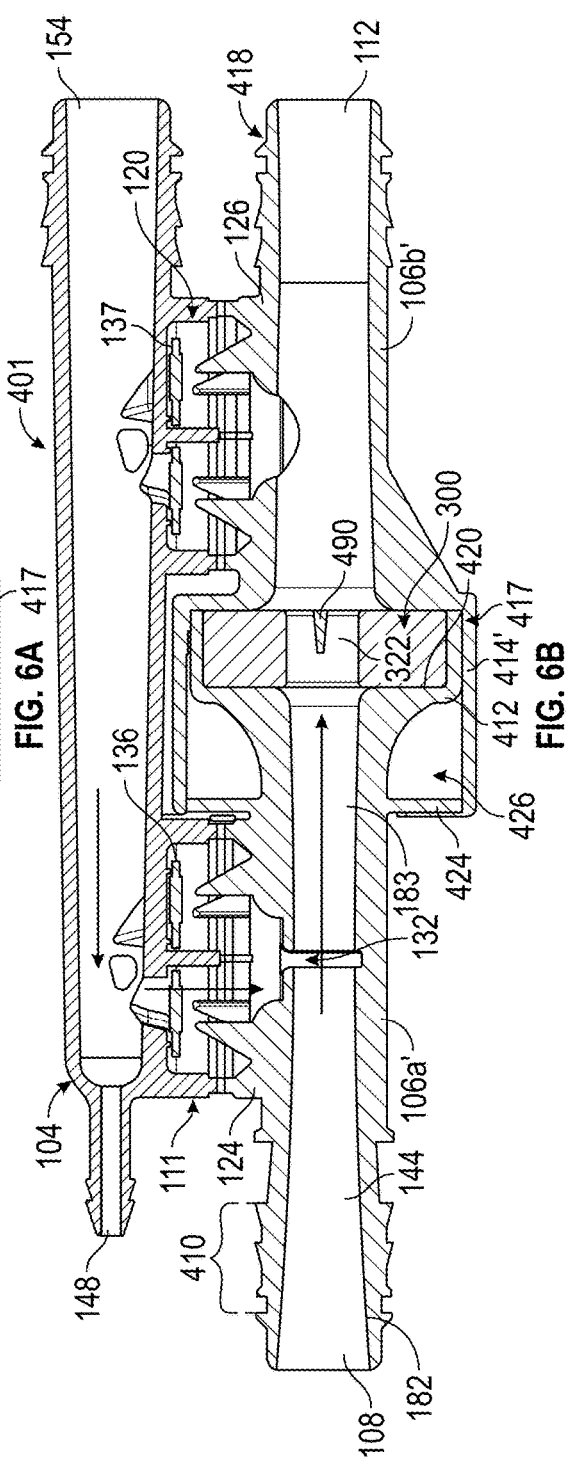

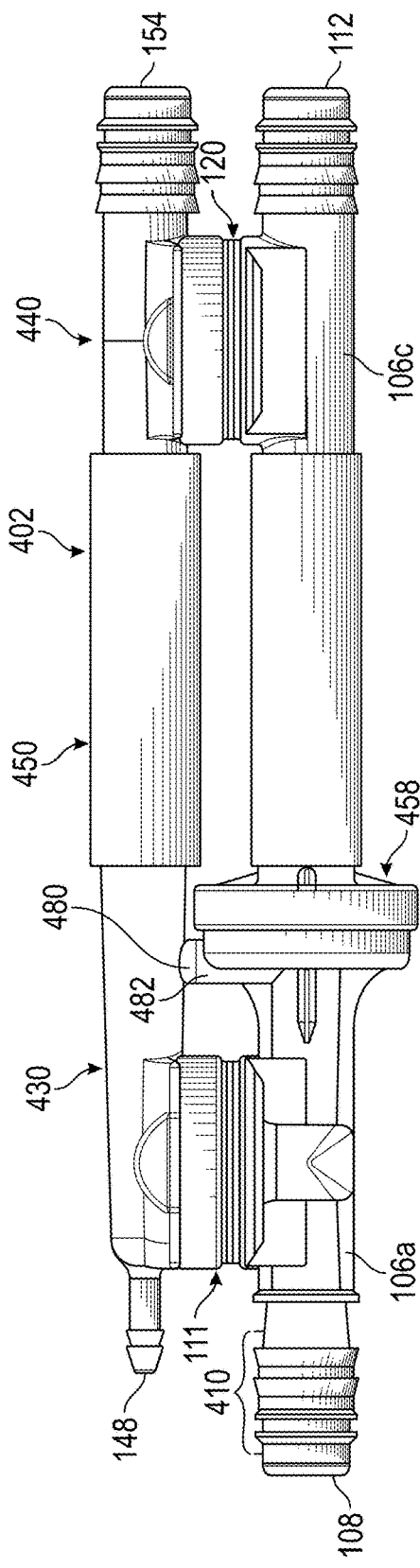

FLASH REDUCED MAINTAINS SHARP EDGE

MEDIA BLASTED

FLASH

AS MOLDED

CORNER RADIUS

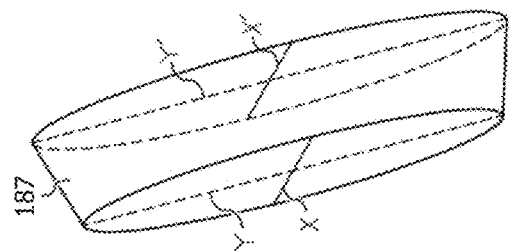
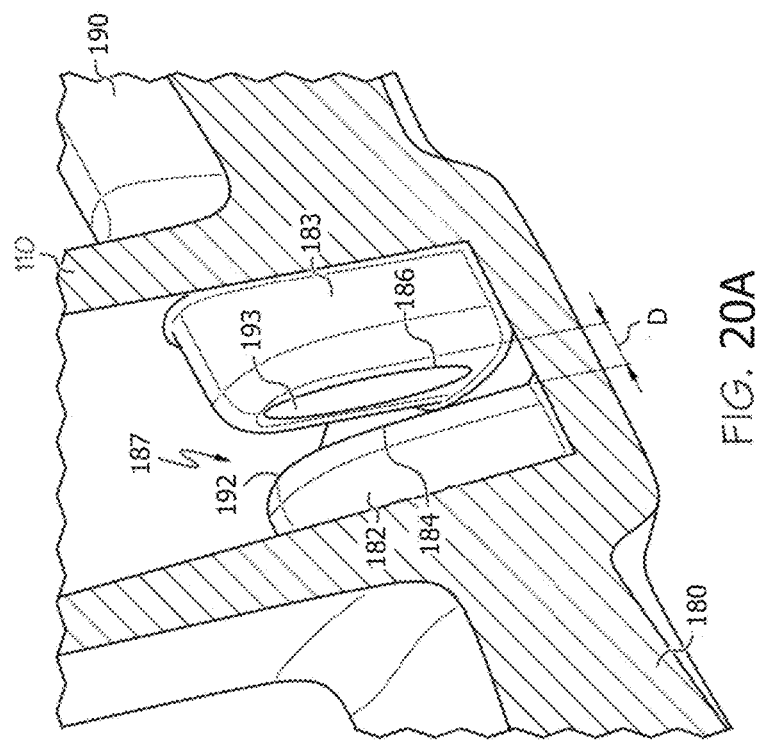

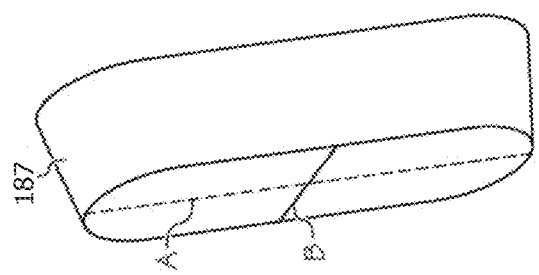
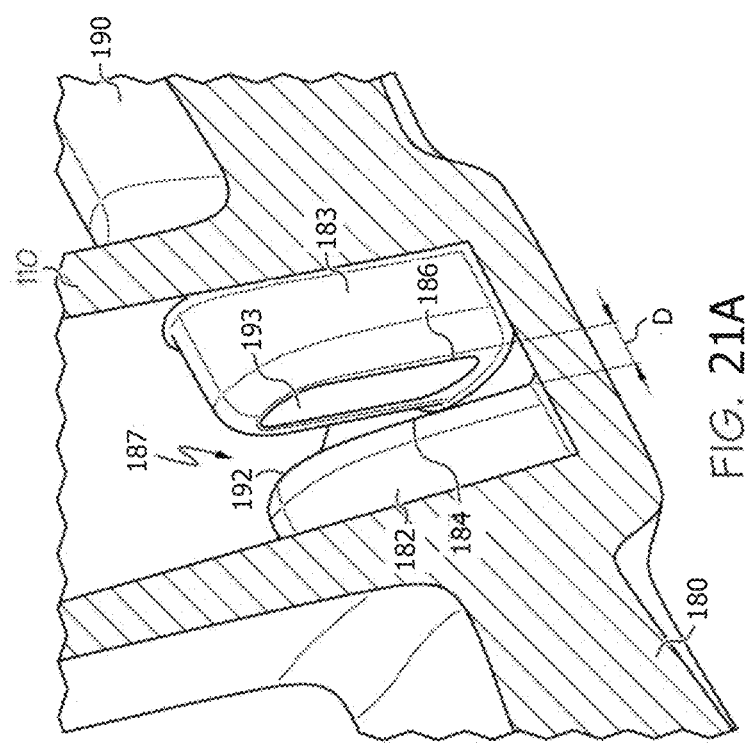

METHODS FOR POST-MOLD PROCESSING A VENTURI DEVICE OR CHECK VALVE

RELATED APPLICATIONS

This application claims the benefit of U.S. Provisional Application No. 62/183,471, filed Jun. 23, 2015.

TECHNICAL FIELD

This application relates to methods for post-mold processing a Venturi device or check valve, more particularly, removing flash from an interior surface of the same and/or forming a corner radius on any one or more inlets or outlets.

BACKGROUND

Engines, for example vehicle engines, are known to include aspirators or ejectors for producing vacuum and/or check valves. Typically, these components are formed from plastic that is molded, such as by injection molding techniques. Molding components is a cost effective way to manufacture the internal passageway(s) to desired geometries out of plastic material that can survive the operating conditions experienced in an engine system. These molding techniques, however, do have some shortcomings. Flash is commonly formed at the interface between the mold core pieces that form the internal passageway(s). This flash can interfere with the flow of fluid through the internal passageways, which is likely to reduce performance of the aspirators or ejectors and/or check valves. The removal of the flash from the interior of aspirators and ejectors and/or check valves needs to be accomplished in a manufacturing efficient and cost effective manner. A second shortcoming is the general difficulty in forming a corner radius on inlets and outlets of the internal passageway(s) during the molding process.

Molding techniques, such as injection molding, tend to provide a surface finish that is generally quite smooth, including those internal surfaces formed by mold core pieces. However, there may be times when a different surface finish could be beneficial, in particular could improve performance of the component.

What is needed is a method or methods that remove the flash, form a corner radius, and, optionally, modify the surface finish of internal passageways.

SUMMARY

In one aspect, methods for post-mold processing a Venturi device for generating vacuum are disclosed that improve the evacuation time thereof. The method includes providing a molded Venturi device having a body defining a Venturi gap between an outlet end of a converging motive passageway and an inlet end of a diverging discharge passageway, where the outlet end defines a motive exit having flash extending radially inward and the inlet end defines a discharge inlet having flash extending radially inward. The method then includes positioning the molded Venturi device with an inlet end of the converging motive passageway facing a blasting nozzle, and propelling blasting media into the motive inlet of the Venturi device to remove the flash in the motive exit and in the discharge inlet. Here, the motive inlet is circularly shaped and the motive outlet is elliptically shaped.

The methods may also include rotating the Venturi device about a central longitudinal axis that runs through the motive inlet, the motive exit, the Venturi gap, and the discharge inlet during the propelling of the blasting media. The number of revolutions during the propelling of the blasting media is in the range of 50 to 500 revolution, more preferably 150 to 400 revolutions.

In some aspects, the methods utilize a blasting nozzle as part of a continuous feed blasting system. In such systems, the method includes positioning the Venturi device includes placing the motive inlet a pre-selected distance apart from the blasting nozzle that enables substantially all the blasting media to be received within the converging motive passageway. Such a system typically includes a reservoir of blasting media and a dust collector for particles less than 150 grit. Optionally, the system has a shield protecting the exterior of the Venturi device from the blasting media.

In all aspects of the methods, the blasting nozzle defines a nozzle exit having a diverging cone, diverging toward the Venturi device.

In some aspects, the methods utilize a blasting nozzle as part of a closed feed media blasting system. In such systems, the method includes inserting a nozzle exit of the blasting nozzle within the motive inlet of the Venturi device.

Also, the methods may include positioning a secondary blasting nozzle facing a suction port of the body, and propelling blasting media into the Venturi device through the suction port. Here, propelling of the blasting media can occur first through the motive inlet and subsequent thereto through the suction port, or simultaneously through the motive inlet and the suction port.

In all aspects of the methods, the blasting media comprises a metal oxide, such as aluminum oxide, or one or more of glass, metal, ceramic, polymer, plant matter, ice, or solid carbon dioxide.

In all aspects of the methods, propelling the blasting media at a rate of media flow that, in addition to removing the flash, modifies the interior surface of the discharge inlet to form a corner radius is desirable. The corner radius is in a range of 0.05 mm to about 1 mm in some embodiment, and in a range of 0.1 mm to about 0.35 mm in other embodiments.

In another aspect, methods for post-mold processing a Venturi device for generating vacuum are disclosed that improve the evacuation time thereof. The method includes providing a molded Venturi device having a body defining a Venturi gap between an outlet end of a converging motive passageway and an inlet end of a diverging discharge passageway, where the outlet end defines a motive exit having flash extending radially inward and the inlet end defines a discharge inlet having flash extending radially inward. The method then includes positioning the molded Venturi device with an outlet end of the diverging discharge passageway facing a blasting nozzle, and propelling blasting media into a discharge exit defined by the outlet end of the diverging discharge passageway to remove the flash in the discharge inlet and in the motive exit.

BRIEF DESCRIPTION OF THE DRAWINGS

FIG. 3 is a front perspective view of a check valve.

FIG. 4 is a longitudinal, cross-sectional view of the check valve of FIG. 3.

FIG. 6A is a side, perspective view of a third embodiment of a Venturi device for drawing suction to create vacuum that includes integral check valves.

FIG. 6B is a side, longitudinal cross-sectional plan view of the aspirator of FIG. 6A.

FIG. 7A is a side, perspective view of a fourth embodiment of a Venturi device for drawing suction to create vacuum that includes integral check valves.

FIG. 7B is a side, longitudinal cross-sectional plan view of the aspirator of FIG. 7A.

FIG. 20A is a side, cross-sectional perspective view taken along a plane parallel to the central longitudinal axis B at the junction of the suction port in one embodiment of a Venturi device for generating vacuum.

FIG. 20B is a representation of the volume of the Venturi gap in FIG. 20A.

FIG. 21A is a side, cross-sectional perspective view taken along a plane parallel to the central longitudinal axis B at the junction of the suction port in another embodiment of a Venturi device for generating vacuum.

FIG. 21B is a representation of the volume of the Venturi gap in FIG. 21A.

DETAILED DESCRIPTION

Figure 1:
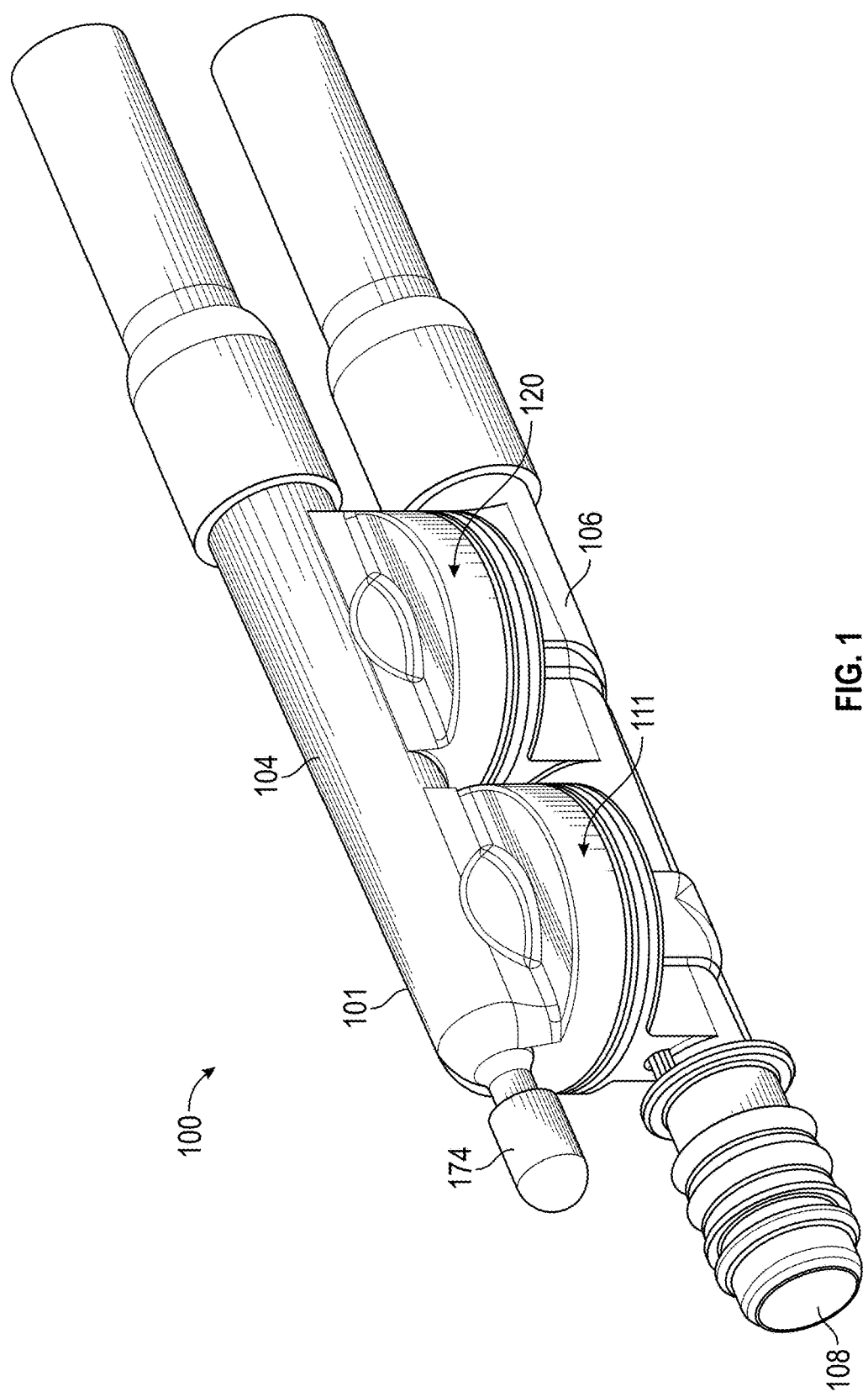
FIG. 1 is a side, perspective view of a first embodiment of a Venturi device for drawing suction to create vacuum that includes integral check valves.

The following detailed description will illustrate the general principles of the invention, examples of which are additionally illustrated in the accompanying drawings. In the drawings, like reference numbers indicate identical or functionally similar elements.

As used herein "fluid" means any liquid, suspension, colloid, gas, plasma, or combinations thereof.

Figure 2:
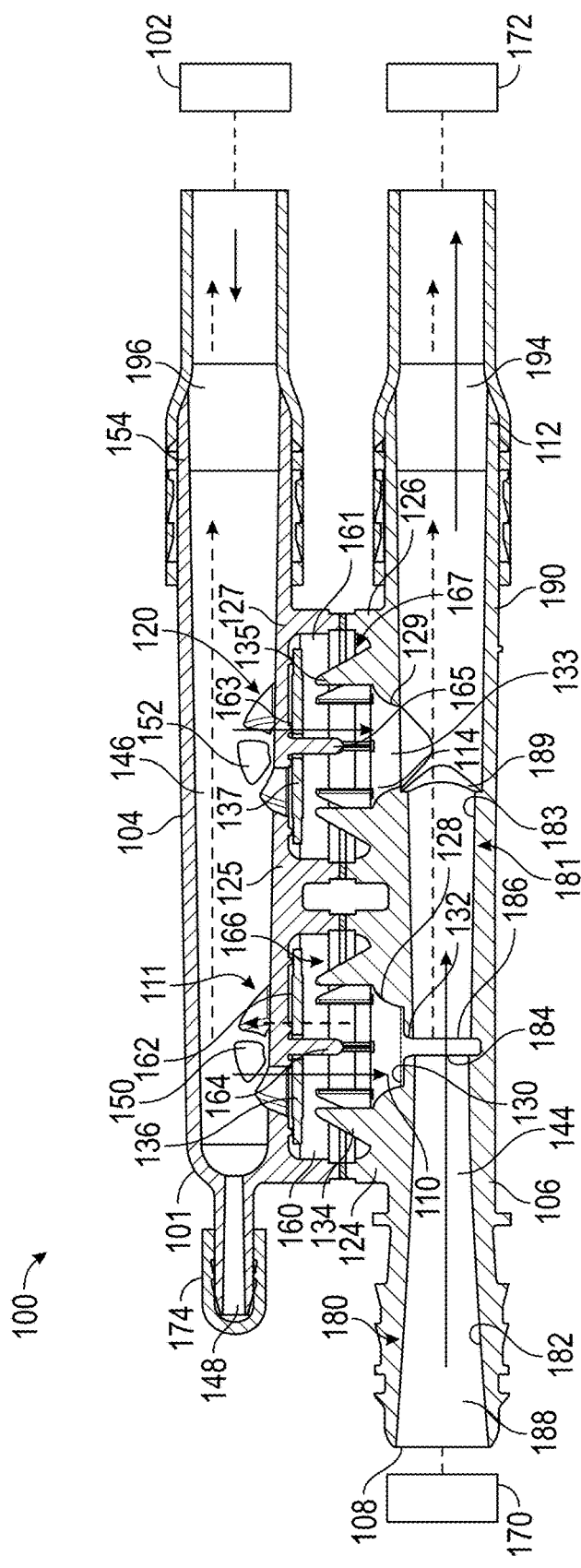
FIG. 2 is a side, longitudinal cross-sectional plan view of the Venturi device FIG. 1.

FIG. 1 is an external view of a Venturi device, generally identified by reference number 100, for use in an engine, for example, in a vehicle's engine, that includes integral check valves 111, 120. The engine may be an internal combustion, and the vehicle and/or engine may include a device requiring vacuum. Venturi devices are often connected to an internal combustion engine before the engine throttle and after the engine throttle. The engine and all its components and/or subsystems are not shown in the figures, with the exception of a few boxes, as shown in FIG. 2, included to represent specific components of the engine as identified herein, and it is understood that the engine components and/or subsystems may include any commonly found in vehicle engines. In embodiments where the motive port 108 is connected to atmospheric pressure 170 and the discharge outlet 112 is connected to lower pressure, such as the intake manifold 172, the Venturi device may be referred to as an aspirator. In other embodiments where the motive port 108 may be connected to boosted pressure, such as the pressures attributed to boosted air produced by a turbo- or supercharger, the Venturi device 100 may be referred to as an ejector.

In an alternate embodiment, the Venturi device 100 could have the check valves 111 and 120 as separate components connected to a suction port and a bypass port, rather than as an integral part of thereof.

The Venturi device 100 is connectable to a device requiring vacuum 102 to create vacuum for said device by the flow of air through a passageway 144, extending generally the length of a portion of the aspirator-check valve assembly, designed to create the Venturi effect. The Venturi device 100 includes a housing 101, which as illustrated is formed of an upper housing portion 104 and a lower housing portion 106. The designations of upper and lower portions are relative to the drawings as oriented on the page, for descriptive purposes, and are not limited to the illustrated orientation when utilized in an engine system. Preferably, upper housing portion 104 is joined to lower housing portion 106 by sonic welding, heating, or other conventional methods for forming an airtight seal therebetween.

Still referring to FIGS. 1-2, the lower housing portion 106 defines passageway 144 which includes a plurality of ports, some of which are connectable to components or subsystems of the engine. The ports include: (1) a motive port 108; (2) a suction port 110, which can connect via the check valve 111 to a device requiring vacuum 102; (3) a discharge port 112; and, optionally, (4) a bypass port 114. Check valve 111 is preferably arranged to prevent fluid from flowing from the suction port 110 to the application device 102. The bypass port 114 may be connected to the device requiring vacuum 102 and, optionally, may include check valve 120 in the fluid flow path therebetween. Check valve 120 is preferably arranged to prevent fluid from flowing from the bypass port 114 to the application device 102.

As shown in FIG. 2, lower housing portions 106 in both embodiments includes lower valve seats 124, 126. Each lower valve seat 124, 126 is defined by a continuous outer wall 128, 129, and, optionally, a bottom wall such as wall 130 in lower valve seat 124. A bore 132, 133 is defined in each lower valve seat 124, 126, respectively, to allow for air flow communication with air passageway 144. In FIG. 2, each lower valve seat 124, 126 includes a plurality of radially spaced fingers 134, 135 extending upwardly from an upper surface thereof. The radially spaced fingers 134, 135 serve to support a seal member 136, 137.

Referring again to FIGS. 1-2, the upper housing portion 104 is configured for mating to or with the lower housing portion 106 to form the check valves 111, 120, if both are present. Upper housing portion 104 defines passageway 146 extending the length thereof and defines a plurality of ports, some of which are connectable to components or subsystems of the engine. The ports include: (1) a first port 148 that may be capped with cap 174 or may be connected to a component or subsystem of the engine; (2) a second port 150 (part of the inlet port for chamber/cavity 166) in fluid communication with the suction port 110 in the lower housing portion 106, and between which the seal member 136 is disposed; (3) a third port 152 (part of the inlet port for chamber/cavity 167) in fluid communication with the bypass port 114 in the lower housing portion 106, and between which the seal member 137 is disposed; and (4) a fourth port 154 which may function as an inlet connecting the aspirator-check valve assembly to a device requiring vacuum 102.

As shown in FIG. 2, the upper housing portion 104 in both embodiments includes upper valve seats 125, 127. Each upper valve seat 125, 127 is defined by continuous outer wall 160, 161 and bottom wall 162, 163. Both upper valve seats 125, 127 may include a pin 164, 165 extending downwardly from the bottom walls 162, 163, respectively, toward the lower housing portion 106. The pins 164, 165 function as a guide for translation of the sealing members 136, 137 within the cavities 166, 167 defined by the mated upper valve seat 125 with the lower valve seat 124 and defined by the mated upper valve seat 127 with the lower valve seat 126. Accordingly, each sealing member 136, 137 includes a bore therethrough sized and positioned therein for receipt of the pin 164, 165 within its respective cavity 166, 167.

The passageway 144 in the lower housing portion 106 has an inner dimension along a central longitudinal axis that includes a first tapering portion 182 (also referred to herein as the motive cone) in the motive section 180 of the lower housing portion 106 coupled to a second tapering portion 183 (also referred to herein as the discharge cone) in the discharge section 181 of the lower housing portion 106. Here, as identified in FIG. 11, the first tapering portion 182 and the second tapering portion 183 are aligned end to end, having the motive outlet end 184 facing the discharge inlet end 186 and defining a Venturi gap 187 therebetween, which defines a fluid junction placing the suction port 110 in fluid communication with both the motive section 180 and the discharge section 181 of the inner passageway 144. The Venturi gap 187 as used herein means the lineal distance D between the motive outlet end 184 and the discharge inlet end 186. The inlet ends 188, 186 and the outlet end 184, 189 may be any circular shape, elliptical shape, or some other polygonal form and the gradually, continuously tapering inner dimension extending therefrom may define, but is not limited to, a hyperboloid or a cone. Some example configurations for the outlet end 184 of the motive section 180 and inlet end 186 of the discharge section 181 are presented in FIGS. 20-22, which are from co-pending U.S. patent application Ser. No. 14/294,727, filed Jun. 3, 2014, incorporated by reference herein in its entirety.

FIGS. 20A-20B and 21A-21B illustrate embodiments with improved fluid junctions where the suction port 110 meets the motive outlet end 184 and the discharge inlet end 186. The smallest area of the flow path from the suction port 110 to the Venturi gap 187 is the frustum defined between the motive outlet end 184 and the discharge inlet end 186, see FIGS. 20B and 21B. In FIGS. 20A and 20B, the outlet end 184 of the motive cone 182 and the inlet end 186 of the discharge cone 183 each have inner and outer elliptical perimeters and thereby define a Venturi gap 187 that is a frustum having an elliptical outer periphery. In FIGS. 21A and 21B, the outlet end 184 of the motive cone 182 and the inlet end 186 of the discharge cone 183 each have inner and outer generally rectangular-shaped perimeters (with rounded corners) and thereby define a Venturi gap 187 that is a frustum having a generally rectangular-shaped outer periphery. While the embodiments in the figures have the same perimeter for the outlet end 184 and the inlet end 186, i.e., both are elliptical or both are generally rectangular, the outlet end 184 and the inlet end 186 may have differently shaped perimeters, i.e., one may be elliptical while the other is generally rectangular. Additionally, the motive outlet end 184 and the discharge inlet end 186 may terminate with a rounded chamfer to improve the directionality of the flow of the fluid from the suction port 110 in to the discharge inlet end 186.

Figure 22:
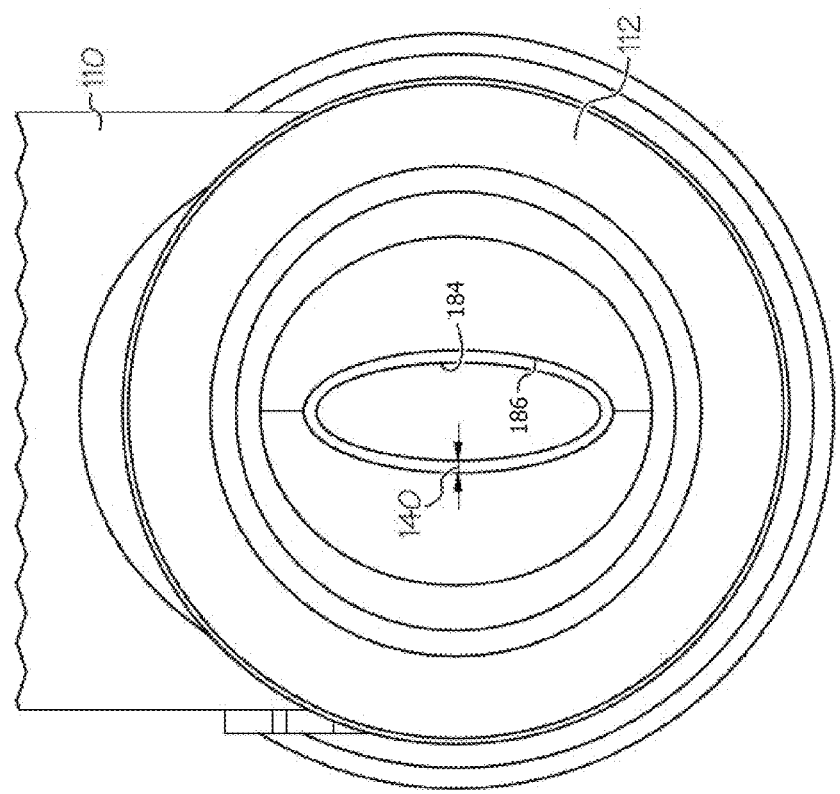
FIG. 22 is a plan view looking into the aspirator from the aspirator outlet showing the offset between the motive outlet end and the discharge inlet end.

Additionally, as seen most clearly in FIG. 22, but is also seen in the frustums of FIGS. 20B and 21B, the outlet end 184 of the motive cone 182 for each embodiment is dimensionally smaller than the inlet end 186 of the discharge cone 183. This difference in dimension is identified as offset 140. In FIG. 20B, for example, the offset is seen in that the length of the major axis Y of the motive outlet end 184 is less than the length of the major axis Y' of the discharge inlet end 186 and may also have a length of the minor axis X of the motive outlet end 184 that is less than the length of the minor axis X' of the discharge inlet end 186.

In any of the elliptical- or polygonal-shaped embodiments, the elliptical- or polygonal-shaped internal cross-section of the motive outlet end of the converging motive section has a ratio of the major axis to the minor axis of about 2 to about 4, and the elliptical- or polygonal-shaped internal cross-section of the inlet end of the diverging discharge section is offset, relative to the elliptical- or polygonal-shaped internal cross-section of the outlet end of the converging motive section, by the ratio of the difference of the discharge inlet area and the motive outlet area to the peak motive flow rate, which is then multiplied by a constant $k_1$ to have a unitless ratio of greater than 0.28.

$$\text{Offset ratio} = (\text{discharge inlet area} - \text{motive outlet area})/\text{peak motive flow rate} * k_1 \quad (I)$$

where $k_1 = c$ at the motive outlet end*$D_{fluid}$ at the motive outlet end; and c is the speed of sound and $D_{fluid}$ is the density of the fluid (typically air).

In any of the elliptical- or polygonal-shaped embodiments, the Venturi gap between the motive outlet end and the discharge inlet end has a gap ratio defined as the area of the Venturi gap divided by the motive flow times a constant $k_2$ (to have a unitless ratio).

$$\text{gap ratio} = \text{area of the Venturi gap}/\text{motive flow rate} * k_2 \quad (II)$$

where $k_2 = c$ at the motive outlet end*$D_{fluid}$ at the motive outlet end; and c and $D_{fluid}$ are as defined above.

Here, the gap ratio is greater than 4.7.

In one embodiment, the elliptical- or polygonal-shaped internal cross-section of the motive outlet end 184 has an eccentricity of between 0 to, and including 1. In another embodiment, the elliptical- or polygonal-shaped internal cross-section of the outlet end has an eccentricity of between about 0.4 to, and including about 0.97.

As seen in FIG. 2, the first tapering portion 182 terminates at a fluid junction with suction port 110, which is in fluid communication therewith, and at this junction the second tapering portion 183 begins and extends away from the first tapering portion 182. The second tapering portion 183 is also in fluid communication with the suction port 110. The second tapering portion 183 then forms a junction with the bypass port 114 proximate the outlet end 189 of the second tapering portion and is in fluid communication therewith. The first and second tapering portions 182, 183 typically share the central longitudinal axis of the lower housing portion 106.

Figure 11:
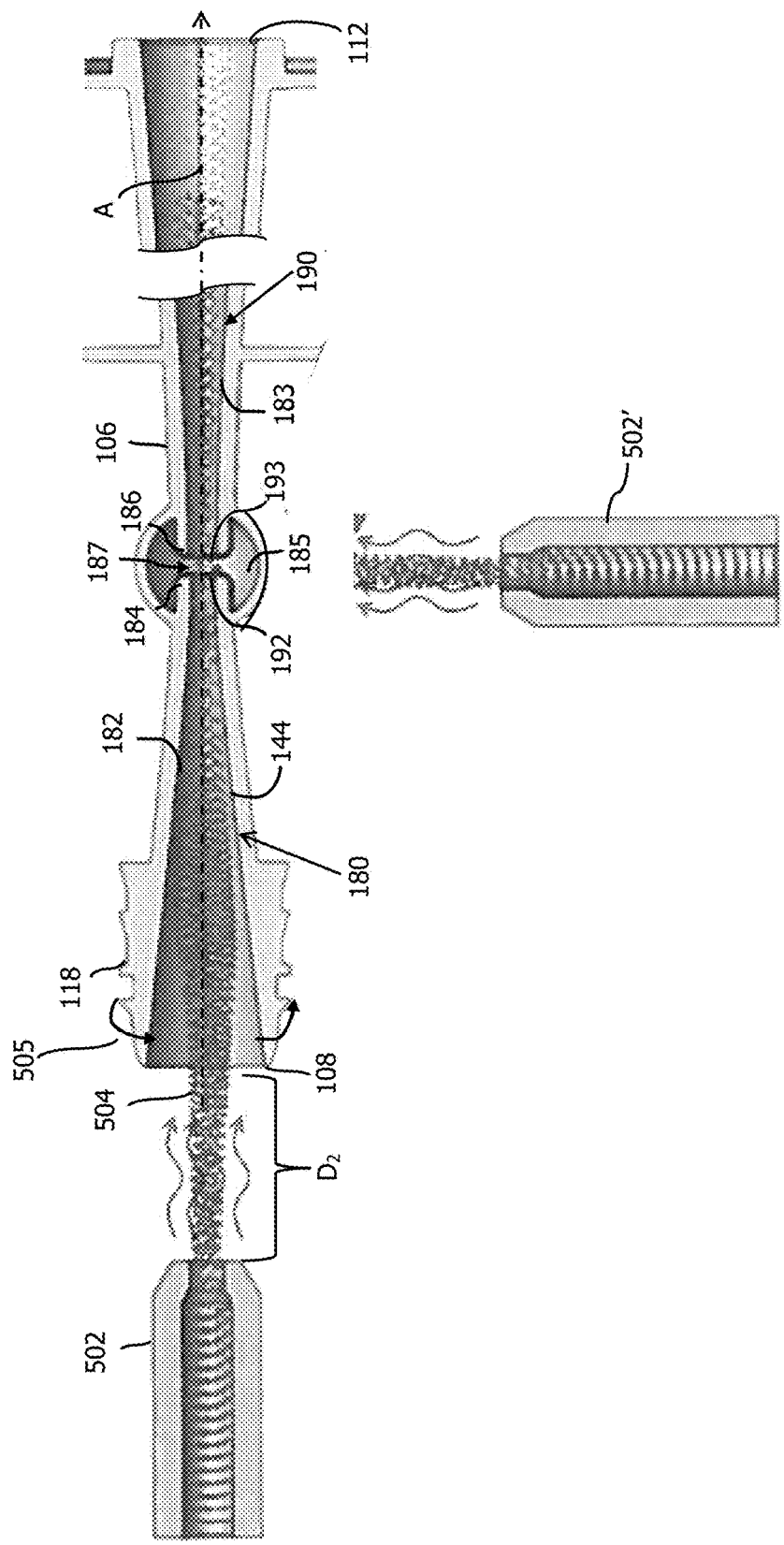
FIG. 11 is a top plan view, in cross-section, of an embodiment of a Venturi device showing media propelled from a blast nozzle into the passageway thereof.

As best seen in FIG. 11, at the motive outlet end 184, the suction port 110 includes an enlarged region defining a void 185 in fluid communication with Venturi gap 187, or conversely the Venturi gap 187 may be considered part of void 185. The fluid junction of the suction port 110 with inner passageway 144 is generally centered relative to the Venturi gap 187 and the void 185 is generally aligned with the suction port's central longitudinal axis and transitions the first tapering portion 182 into the second tapering portion 183. The void 185 may be shaped as a parallelepiped whose length is similar to the suction port's interior cross-section dimension(s), but whose bottom is an arcuate projection projecting downward away from the suction port 110. The void is generally U-shaped around and/or over the discharge inlet end 186 and the motive outlet end 184, but may also fully encompass and surround the outer surfaces thereof.

The second tapering portion 183 tapers gradually, continuously from a smaller dimensioned inlet end 186 to a larger dimensioned outlet end 189. The optional bypass port 114 intersects the discharge section 190 as described above to be in fluid communication with the second tapering section 183 as shown in FIG. 2. The bypass port 114 may intersect the second tapering section 183 adjacent to, but downstream of the outlet end 189. The lower housing portion 106 may thereafter, i.e., downstream of this intersection of the bypass port, continue with a cylindrically uniform inner passage until it terminates at the discharge port 112. Each of the respective ports 108, 110, 112, and 114 may include a connector feature 118 on the outer surface thereof for connecting the passageway 144 to hoses or other features in the engine.

The Venturi device 100 may include one or more sound attenuating members 194, 196, but these are not required. The sound attenuating members 194, 196 are placed within the flow path proximate, but downstream of the regions where turbulence generated noise is created, as explained in co-pending U.S. patent application Ser. No. 14/509,612, filed Oct. 8, 2014, incorporated by reference herein in its entirety. The sound attenuating members 194, 196 are porous such that fluid flow through and between the passageways 144, 146 is not restricted, but sound (turbulence generated noise) is attenuated. With reference to FIG. 2, the solid arrows represent the fluid flow within the aspirator-check valve assembly and the dashed arrows represent the path for travel of the turbulence generated noise.

Referring now to FIGS. 3-4, an independent check valve 202 is shown. The check valve 202 includes a housing 204 defining an internal cavity 206 having a pin 264 therein upon which is seated a sealing member 236 and defining a first port 210 in fluid communication with the internal cavity 206 and a second fluid port 212 in fluid communication with the internal cavity 206. The internal cavity 206 typically has larger dimensions than the first port 210 and the second port 212. In the illustrated embodiments, the first port 210 and the second port 212 are positioned opposite one another to define a generally linear flow path through the check valve 202, when the sealing member 236 is not present, but is not limited to this configuration. The portion of the housing defining the internal cavity 206 includes an internal first seat 214 upon which the sealing member seats when the check valve is closed and a second seat 216 upon which the sealing member seats when the check valve is open. In FIG. 4, the second seat 216 is a plurality of radially spaced fingers 234 extending into the internal cavity 206 from an interior surface of the internal cavity that is more proximate the first port 210.

The embodiments depicted in FIGS. 5A and 5B, 6A and 6B, and 7A and 7B are of alternate embodiments of aspirators 400, 401, and 402, respectively. Reference numbers identifying similar or the same components as described for FIGS. 1-2 are used in these figures as well. Each of these aspirators 400, 401, 402 include a porous sound attenuating member 300 within passage way 144 downstream of the bore 132 of a Venturi portion and disposed in the discharge section 181 (the outlet port of chamber 166).

Figure 5A:
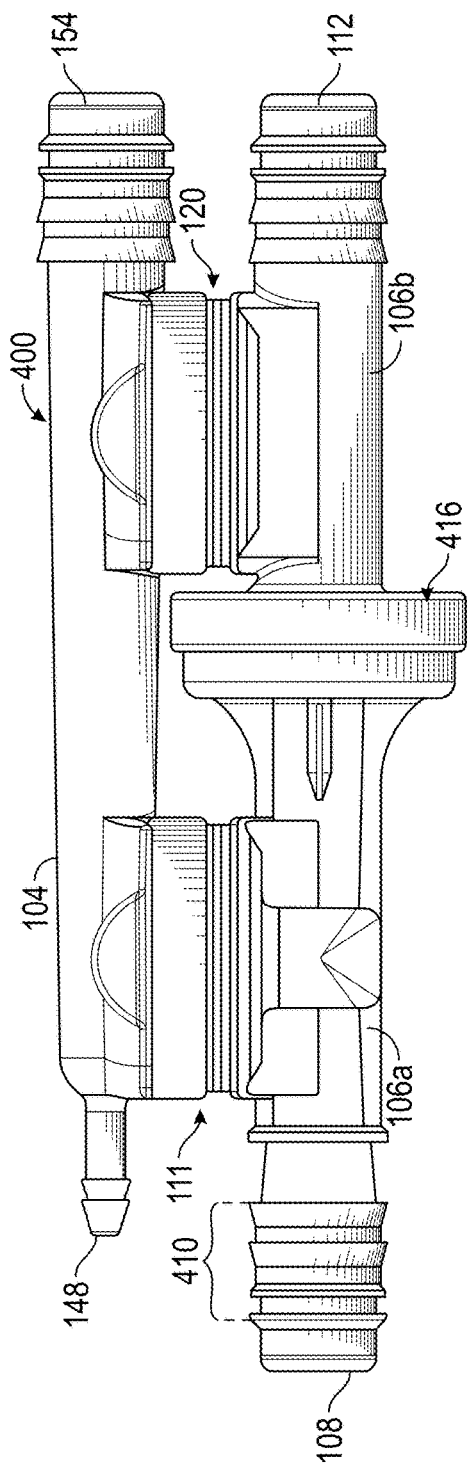
FIG. 5A is a side, perspective view of a second embodiment of a Venturi device for drawing suction to create vacuum that includes integral check valves.
Figure 5B:
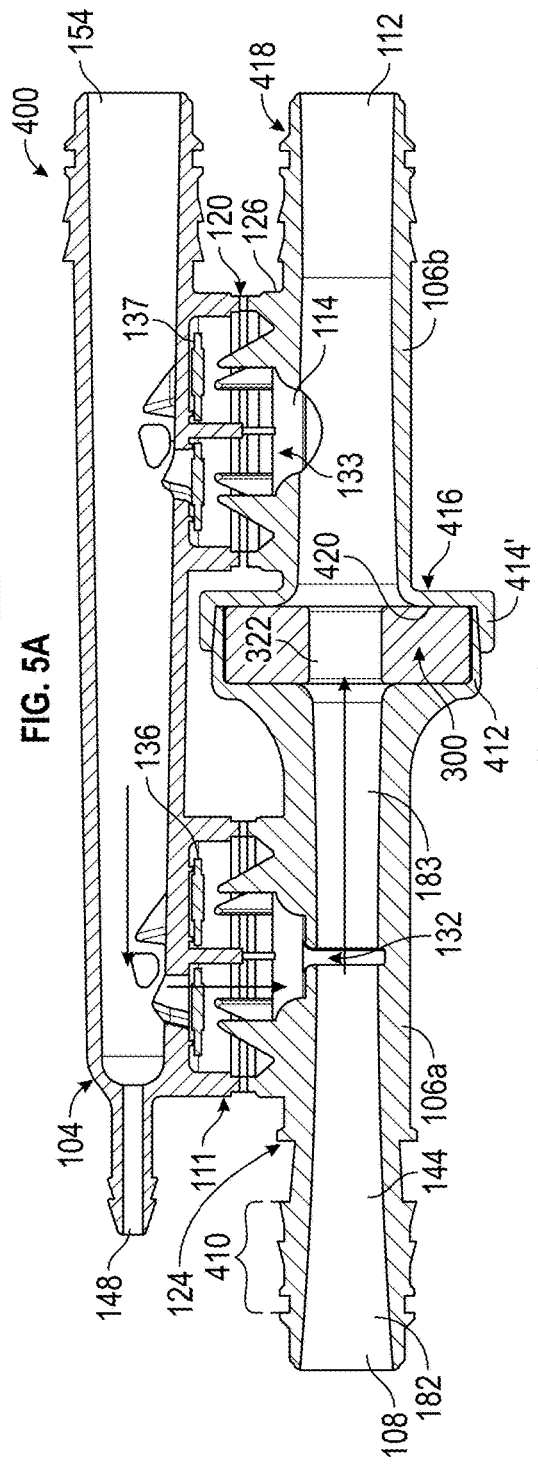
FIG. 5B is a side, longitudinal cross-sectional plan view of the aspirator of FIG. 5A.
Figure 8:
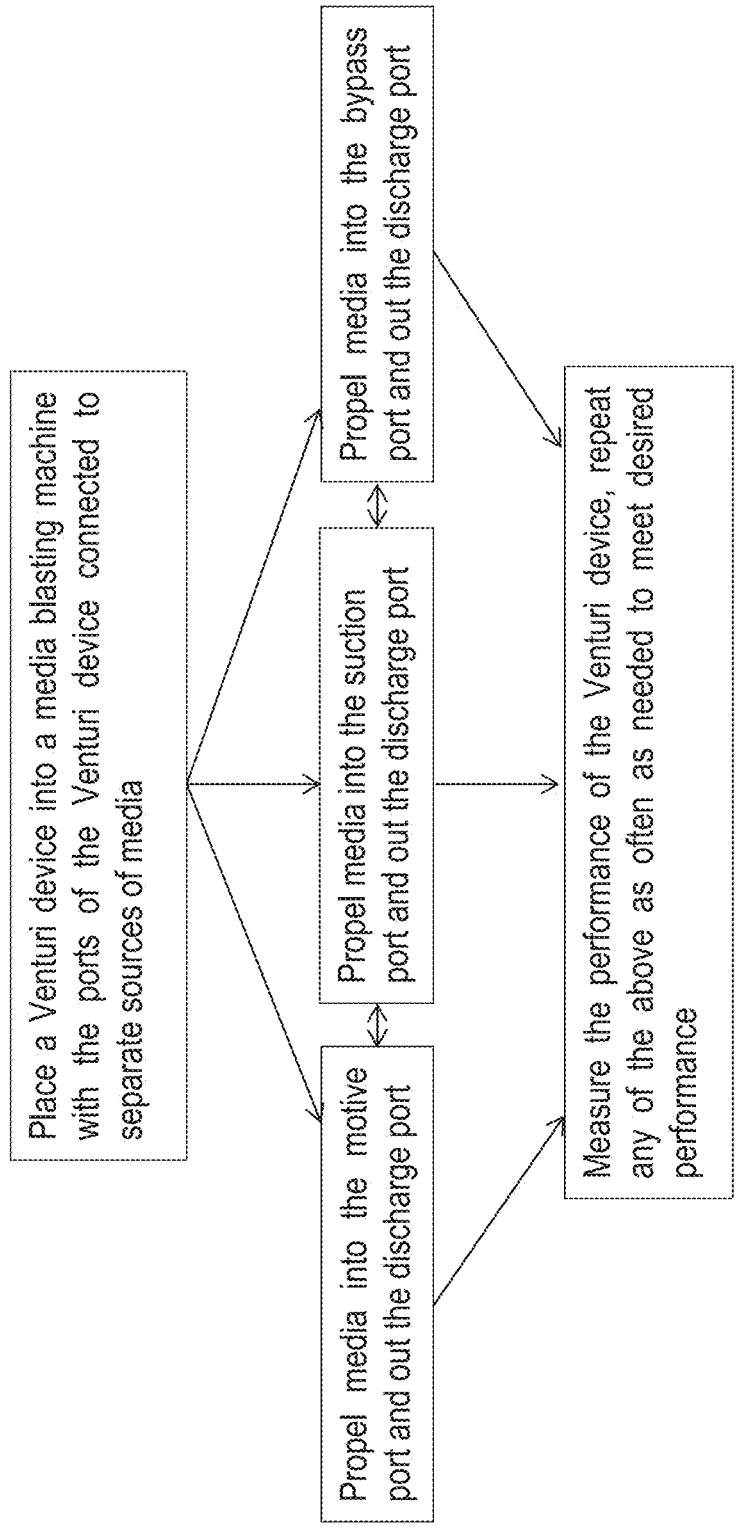
FIG. 8 is a flowchart representing methods of post-molding, media blasting processing of various embodiments of Venturi devices or check valves.

The embodiment of FIGS. 5A and 5B has three primary housing pieces: (1) the upper housing 104 as described above and the lower housing 106 described above, but split into a (2) Venturi portion 106a and (3) a bypass portion 106b. The Venturi portion 106a includes a motive port 108 that may include a hose connector 410 on the outer exterior surface defining the motive port 108, a motive cone 182, a suction Venturi 132, the lower half of the check valve 111, specifically the lower valve seat 124, and a discharge cone 183 terminating in a first canister portion 412. The bypass portion 106b includes a second canister portion 414 matable with the first canister portion 412 to enclose the sound attenuating member 300 in an enclosed chamber 420 defined by canister 416 formed when the first and second canister portions 412, 414 are mated together. The bypass portion 106b also includes a bypass port 114 and the lower half of the check valve 120, specifically the lower seat 126, and discharge port 112 that may include a hose connector 418 on the outer exterior surface defining the discharge part 112.

When the upper housing 104 and the Venturi portion 106a and the bypass portion 106b are assembled, a first check valve disc 136 is seated in check valve 111 and a second check valve disc 137 is seated in check valve 120.

The embodiment of FIGS. 6A and 6B has three primary housing pieces: (1) the upper housing 104, and the lower housing 106 described above, but split into a (2) Venturi portion 106a' and (3) a bypass portion 106b'. The Venturi portion 106a' is the same as disclosed in FIG. 5B except that upstream of where the discharge cone 183 terminates in a first canister portion 412, a collar 424 extends radially outward from the exterior surface of the discharge cone 183. As seen in FIG. 6B, the collar 424 is positioned between the bore 132 and the first canister portion 412. The bypass portion 106b' is the same as disclosed in FIG. 5B except that the second canister portion 414' is configured to extend beyond the first canister portion 412 to mate to or be coupled to the collar 424. When the first canister portion 412 and the second canister portion 414' are mated together they enclose a sound attenuating member 300 therebetween in an enclosed chamber 420' and also form a second chamber 426 located between the collar 424 and the first canister portion 412. When assembled, the canister 417 is dual chambered having the second chamber 426 surrounding the outside of the discharge cone 183 upstream from the first chamber 420 housing the sound attenuating member 300.

Referring now to FIG. 6B, the second chamber 426 contains air and may be sealed to contain the air or may be in fluid communication with ambient air surrounding the aspirator 401. In another embodiment (not shown), the second chamber 426 may include a second sound attenuating member, which may be a porous material that does or does not include bore holes. When assembled, the aspirator 401 also includes, a first check valve disc 136 seated in check valve 111 between the upper housing 104 and the Venturi portion 106a' and a second check valve disc 137 seated in check valve 120 between the upper housing 104 and the bypass portion 106b'.

Additionally, as shown in FIG. 6B, the bypass portion 106b' includes one or more fingers 490 extending into the bore 322 of the sound attenuating member 300 at a position that places the fingers generally against a surface thereof that defines the outermost diameter or dimension of the bore 322. If a plurality of fingers 490 are present, they may be equally distant apart from adjacent neighboring fingers 490. The one or more fingers 490 provide the advantage of maintaining the sound attenuating member in its install position and to reduce deformation of the material during operating conditions of the system. While the finger 490 is shown as part of the bypass portion 106b', in another embodiment, the fingers could instead extend from the Venturi portion 106a'.

The embodiment of FIGS. 7A and 7B is essentially the embodiment of FIGS. 5A and 5B, but divided into two subassemblies 430, 440, one of which includes a sound attenuating canister 458, joinable into fluid communication by one or more hoses 450. The embodiment of FIGS. 6A and 6B could also be divided into two subassemblies as well in a similar fashion even though not illustrated in the figures. The subassemblies include a Venturi subassembly 430 and a bypass subassembly 440.

The Venturi subassembly 430 includes a first upper housing portion 432 that includes the upper valve seat 125 as described above and a lower Venturi portion 106 as described in FIG. 6B, which terminates with a first canister portion 412. When the first upper housing portion 432 is mated to the lower Venturi portion 106, a first check valve disc 136 is seated between the upper valve seat 125 and the lower valve seat 126 to form check valve 111. The Venturi portion 106a includes a motive port 108 that may include a hose connector 410 on the outer exterior surface defining the motive port 108, a motive cone 182, a suction Venturi 132, the lower half of the check valve 111, specifically the lower valve seat 124, and a discharge cone 183 terminating in a first canister portion 412. Connectable to the lower Venturi portion 106 is a canister cap 460 comprising a second canister portion 462 and a connector portion 464 having hose connecting features 466 on its exterior surface. The second canister portion 462 is matable with the first canister portion 412 to enclose the sound attenuating member 300 in an enclosed chamber 470 formed therebetween when the first and second canister portions 412, 414 are mated together.

As illustrated in FIGS. 7A and 7B, the first upper housing 430 may include a first stabilizing member 480 facing the lower Venturi portion 106 and positioned to mate with a second stabilizing member 482 included as part of the lower Venturi portion 106. The assembled aspirator 402 has the first stabilizing member 480 mated with the second stabilizing member 482 to stiffen and strengthen the aspirator, in particular the half of the aspirator having the sound attenuating canister 458.

The bypass subassembly 440 includes a second upper housing portion 434 and a lower bypass portion 106c. The second upper housing portion 434 includes an upper valve seat 125 defining, as described above, a portion of check valve 120 and the third port 152, which is in fluid communication with the bypass port 114 in the lower bypass housing portion 106c. The second upper housing portion 434 also includes a conduit 472 having a fifth port 474 connectable to a sixth port 436 of the first upper housing portion 432 by a hose 450. The upper bypass housing portion 434 also includes the fourth port 154, described above, which may function as an inlet connecting the aspirator-check valve assembly 402 to a device requiring vacuum. The lower bypass housing portion 106c includes the bypass port 114, the lower half of the check valve 120, specifically the lower valve seat 126, and the discharge port 112 that may include a hose connecting features 418 on its outer exterior surface.

As shown in FIG. 7B, the canister cap 460 includes one or more fingers 490' extending into the bore 322 of the sound attenuating member 300 at a position that places the fingers generally against a surface thereof that defines the outermost diameter or dimension of the bore 322. If a plurality of fingers 490' are present, they may be equally distant apart from adjacent neighboring fingers 490'. The one or more fingers 490' provide the advantage of maintaining the sound attenuating member in its install position and to reduce deformation of the material during operating conditions of the system. While the finger 490' is shown as part of the canister cap 460, in another embodiment, the fingers could instead extend from the Venturi portion 106a.

Figure 12:
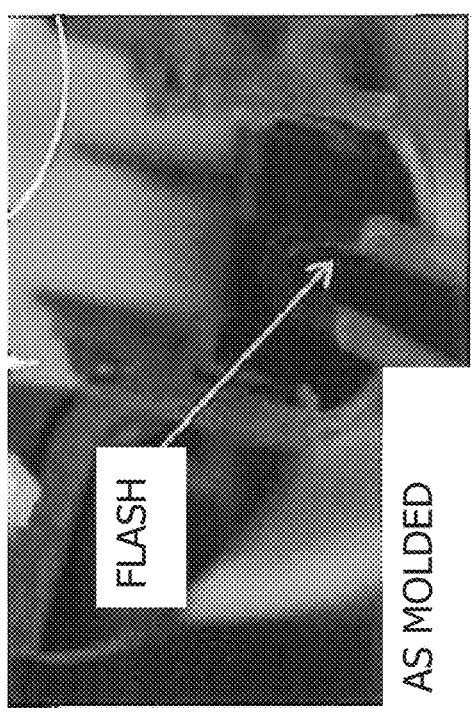
FIG. 12 is a photograph of flash present after injection molding the piece.
Figure 14:
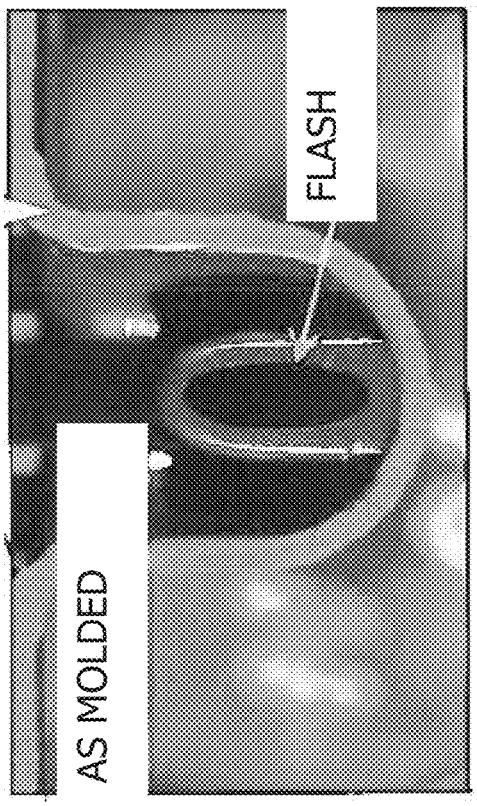
FIG. 14 is a photograph of an end view of an inlet with flash present after injection molding the piece.

The various embodiments of Venturi devices, the subcomponents thereof, such as the lower housing portion 106, the upper body portion 104, the lower Venturi portion 106a, 106a', the lower bypass portion 106b, 106b', 106c, check valves, and variations thereof may be manufactured using molding techniques. Injection molding is of interest because it is cost effective and utilizes cost effective materials that are suitable for the environment experienced during operating conditions in an engine system, such as a vehicle engine system. To mold the lower housing portion 106 or the subcomponents thereof to form the geometry of the passageway 144, including the Venturi gap 187, core pins or core molds (not shown) are part of the mold and typically enter the mold from opposing ends and mate together to a desired internal geometry. Depending on the shape of the Venturi gap 187 and void 185, the mold also includes an appropriately shaped insert that fits between the core pins or core molds or fits around the mated core pins or core molds. This process results in the formation of flash on one or both of the interior edge of the motive exit 192 or the interior edge of the discharge inlet 193 at the Venturi gap 187 as shown in the photographs of FIGS. 12 and 14 and in FIG. 17 as represented by the dashed lines 310.

Methods for removing the flash as part of a post-molding manufacturing process are illustrated in FIGS. 8-11. One embodiment of a post-molding manufacturing process includes providing a molded Venturi device or a body portion thereof, such as the lower body housing 106, or a check valve that has flash present from the molding process, placing a Venturi device, a subcomponent thereof, or a check valve in a media blasting machine (see FIG. 18) with one or more of the ports thereof connected to a source of blasting media, propelled via a blasting nozzle 502. Once each selected port is connected to the media blasting machine, a blasting media 504, preferably suspended in a transport fluid, is propelled into and through each port (and out the discharge port 112, for example) for a controlled period of time. When a plurality of ports are present, such as the motive port 108 and the suction port 110 of a Venturi device, the blasting media may be propelled simultaneously into and through both ports or sequentially in any order through separate nozzles 502, 502' shown in FIG. 11. For example, the blasting media may be propelled into and through the motive port 108 for a controlled period of time, and subsequent thereto, media may be propelled into and through the suction port 110 for a controlled period of time. If the bypass port 114 is present in the Venturi device, media may be propelled into and through the bypass port 114, simultaneously with the motive port 108 and the suction port 110 or sequentially before or after either of or both the motive port 108 and the suction port 110. In another example, the blasting media may be propelled into and through the discharge port 112 (and out the motive port 108) for a controlled period of time, which may be before, after, or independent of propelling blasting media into and through the motive port 108.

The blasting media 504 may be glass, metal, ceramic, polymer, plant matter, ice, water, solid carbon dioxide or other materials that can modify the interior surface of the Venturi device, the subcomponent thereof, or the check valve, and combinations thereof, in particular one that removes the flash. Example blasting media include, but are not limited to, aluminum oxide, fine steel blasting abrasive, such as Dee-Blast 110 grit fine steel blasting abrasive, coarse polymer resin, such as Dee-Blast 112-16 grit coarse polymer resin blasting abrasive, garnet bead blasting media (coarse grade), 120-220 grit silicon carbide. In selecting a blasting media several factors should be considered, the thinness of the flash and thereby its flexibility to be deflected by the media rather than cut or worn away by the blasting media, the sharpness of the blasting media, the stability of the blasting media (its ability to maintain its size and not break down during the process), and the time allotted to remove the flash and form the corner radius. A sharper blasting media is preferred because it tends to cut the flash away rather than gradually wearing the flash away, which reduces the time necessary for this portion of the manufacturing process. A grit size of less than 150 grit is recommended, but less than 100 grit is more preferred. The transport fluid may be compressed air or other source of gas, water, oil, or other suitable fluids.

Figure 18:
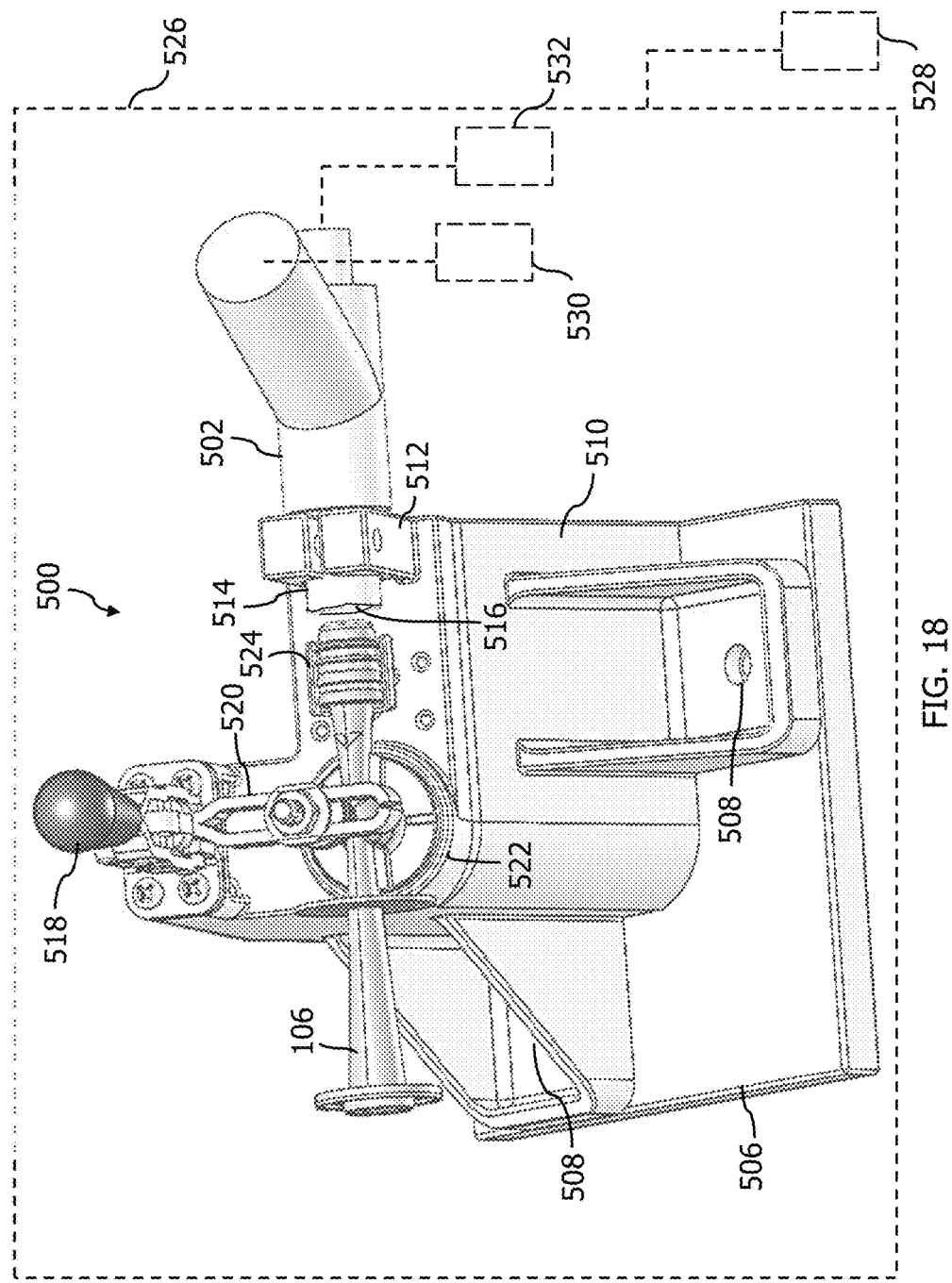
FIG. 18 is a perspective, top view of the internal components of a bench top continuous feed media blasting system with the lower housing portion 106 of the Venturi device positioned therein.

Referring now to FIG. 18, a portion of a TRINCO® bench model blasting machine 500 is illustrated (the housing 526 with the dust collector 528, source of transport fluid 530, a reservoir of blasting media 532 are shown as dashed boxes). The machine 500 has a support base 506 having a plurality of mounting holes 508 for anchoring this portion within a protective cabinet as part of the housing 526. The support base 506 has a mounting platform 510 extending therefrom that includes a bracket 512 for removably positioning the blasting nozzle 502, in particular the tip 514 defining a nozzle exit 516 thereof, in a fixed relationship relative to the part to be modified by the blasting media. The machine 500 further includes a handle 518 for operating a clamp 520 that holds the part to be modified, here lower housing portion 106, in relation to the tip 514 of the blasting nozzle 502. The mounting platform 510 may include a seat 522 for the Venturi gap section of the lower housing portion 106 to register the part in the proper position relative to the blasting nozzle 502, and may optionally include a cradle 524 for a hose connector or other connector present at the end of the lower housing portion 106 that is most proximate the blasting nozzle 502. Once the lower housing portion 106 is clamped into place in the machine 500 next to the blasting nozzle 502, the blasting media may be propelled from the blasting nozzle 502 into the interior passageway 144 of the lower housing portion 106 for a selected time at a selected pressure.

The machine 500 is a passive or continuous feed system that itself uses the Venturi principle to propel the blasting media 504 through the nozzle 502. As such to avoid generating back pressure that would prevent proper flow of the blasting media through the nozzle, the part to be modified is positioned spaced a distance $D_2$ (FIG. 11) apart from the blasting nozzle 502, in particular the nozzle exit 516. This spaced apart distance $D_2$ should not be so great that the blasting media 504 spreads radially outward and impacts the exterior of the part, in particular the hose connecting feature 118 and modifies this feature. $D_2$ is a pre-selected distance from the blasting nozzle that enables substantially all the blasting media to be received within the converging motive passageway. Substantially, as used herein, means less than 5% of the blasting media hits the exterior of the Venturi device during the period of time selected for propelling the blasting media, more preferably less than 3%. If needed, the exterior of the part may be shielded from the blasting media 504 by a shield (not shown) having an opening therethrough positioned to correspond to the motive port's opening.

Figure 19:
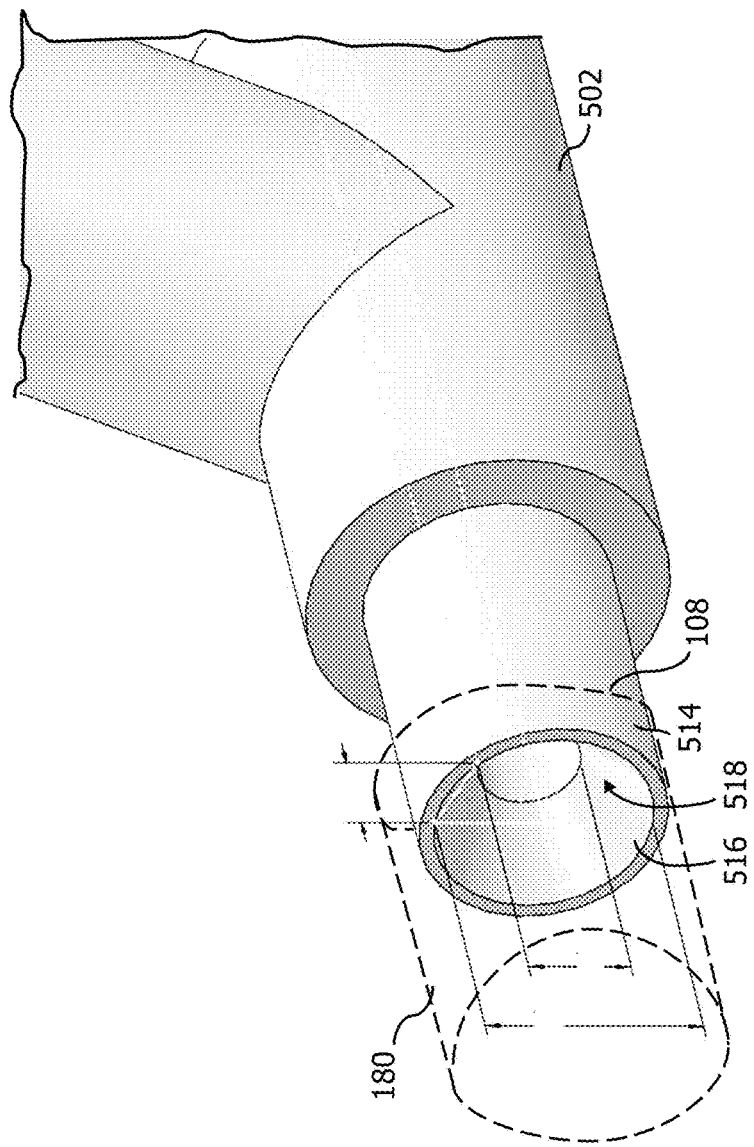
FIG. 19 is a perspective, side view of the blasting nozzle showing the nozzle exit's internal profile.

Referring now to FIG. 19, the blasting nozzle 502 selected for use with the machine 500 is one having a tip 514 defining a diverging cone 518 as the nozzle exit 516, which diverges toward the part to be modified, i.e., the lower housing section 106 in FIG. 18. This type of blasting nozzle was selected to provide turbulent flow to the blasting media. It was determined that turbulent flow outperformed nozzle's providing laminar flow, which is believed to be linked to the lower housing portion 106 having a converging or diverging passageway receiving the blasting media and because the motive exit and discharge inlet are elliptical or polygonal in shape.

The machine 500 mounts the lower housing portion 106 in a stationary relationship relative to the blasting nozzle, but in other embodiments, the part may be mounted for rotation of 50 to 500 revolutions during the introduction of the blasting media 504, or more preferable 150 to 400 revolutions, and even more preferably about 250 to 300 revolutions. The revolutions are about the central longitudinal axis A (see arrows 505 in FIG. 11) of passageway 144 through the motive section 180, the Venturi gap 187, and the discharge section 190. Here, the revolutions are useful to decrease the time period needed during the introduction of the blasting media because, as discussed above, the motive exit 192 and the discharge inlet 193 are each one of an elliptical, rectilinear, or another polygonal shape (they are not circular).

In another embodiment, the blasting machine may be a closed system having an active source of blasting media. Here, there is a source of pressurized blasting media that pushes the blasting media through the nozzle, i.e., no Venturi effect is used in this nozzle. This method while equally effective, requires period halts in production to replace the source of pressurized blasting media, i.e., when the container runs out. Since a source of pressurized blasting media is used, there is no need for a gap between the part being modified and the blasting nozzle. As such, the motive inlet of the part may be directly contacting the nozzle exit 516 or the nozzle exit (tip 514) may be inserted into the motive inlet of the part.

Each time the media is propelled through a port, the controlled time period may be the same, may be increased sequentially, or decreased sequentially. In one embodiment, the controlled time period for media to pass through the motive port 108 may be greater than the controlled time period for media to pass through the suction port 110 and/or through the bypass port 114 if present, or vice versa. While not illustrated in FIG. 8, it is possible to propel media into and through the discharge port 112 (and out the motive port 108), as well, in sequence before or after any one of the other phases of propelling media to remove flash.

The connection to the media blasting machine may be through the alignment of separate nozzles with each inlet of the ports present in the Venturi device, the subcomponent thereof, or the check valve. The tip of each nozzle may be inserted into each inlet or may be spaced a selected distance from the inlet, or may be connected to the inlet by a length of tubing.

The rate of material removal (such as the flash) and rate of radius increase (such for corner radius formation) are important in determining the rate of media flow through the nozzle and the controlled time period for the introduction of the media into and through the Venturi device, the subcomponent thereof, or the check valve. The rate of media flow is controllable to achieve desired material removal of the flash, and radius increase for the corner radius. Also, the pressure of the transport fluid before entry into the nozzle is controllable to change the speed of the media particles. In one embodiment, the rate of media flow through the nozzle for corner radius formation is greater than the rate of media flow through the nozzle for flash removal. In one embodiment, the media is introduced into the Venturi device, the subcomponent thereof, or the check valve at a first rate of media flow through the nozzle to remove the flash and then at a second rate of media flow through the nozzle to form a corner radius on an inlet or outlet thereof. The second rate may be greater than the first rate, or conversely the first rate may be greater than the second rate.

Figure 16:
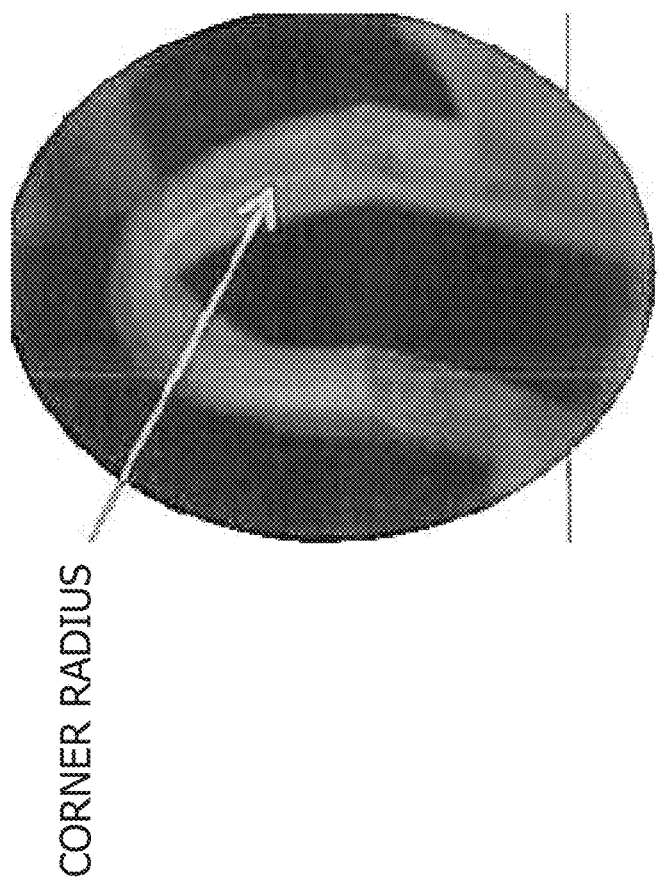
FIG. 16 is a photograph of a corner radius formed in an inlet of a Venturi device by a media blasting process.
Figure 17:
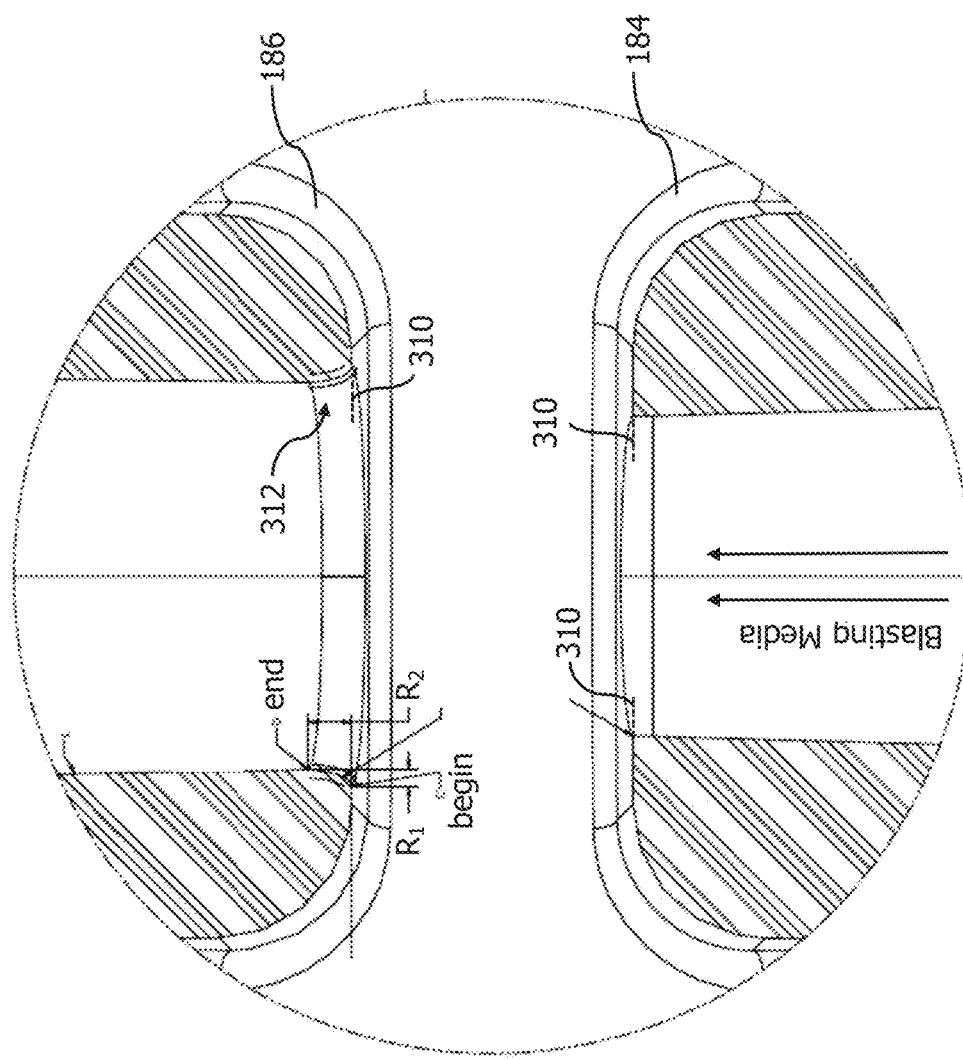
FIG. 17 is an enlarged view of the Venturi gap and outlet end of the motive section and the inlet end of the discharge section.

The media blasting may also be used to modify the interior surface of the Venturi device, the subcomponent thereof, or the check valve or to form a corner radius on one or both of the interior edge of the motive exit 192 or the interior edge of the discharge inlet 193 at the Venturi gap 187. An example of a corner radius formed by media blasting is shown in the photograph of FIG. 16 and the drawing of FIG. 17. In FIG. 17, the corner radius 312 is formed after the flash 310 is removed as described above. The corner radius 312 is formed in the discharge inlet 193 and extends from the word "begin" to the word "end" in the drawing. The corner radius may be in a range of about 0.05 mm to about 1 mm, or more preferably about 0.1 mm to about 0.3 mm or about 0.1 mm to about 0.35 mm. As shown in the cross-section of FIG. 17, the corner radius has a plurality of regions of curvature $R_1$ and $R_2$ that together form the entire corner radius 312. Region of curvature $R_2$ is positioned further inward relative to the central longitudinal axis A into the diverging discharge passageway. The length of each region of curvature $R_1$, $R_2$ both fall within the mm ranges set forth above, but the length of $R_1$ is typically smaller than the length of $R_2$, while the radius of curvature for $R_1$ is greater than the radius of $R_2$. In the embodiment of FIG. 17, the corner radius 312, in cross-section, is generally shaped as the portion of an ellipse, for example the arc between one vertex and one co-vertex of an ellipse, or some portion of that arc.

Media blasting may also modify the surface finish of the passageway 144 to enhance fluid flow through the Venturi device, the subcomponent thereof, or the check valve. In one embodiment, the surface roughness average (Ra) of the interior surface of the passageway 144 is in a range of about 0 to about 1000 µin, more preferably about 0 to about 300 µin.

Figure 13:
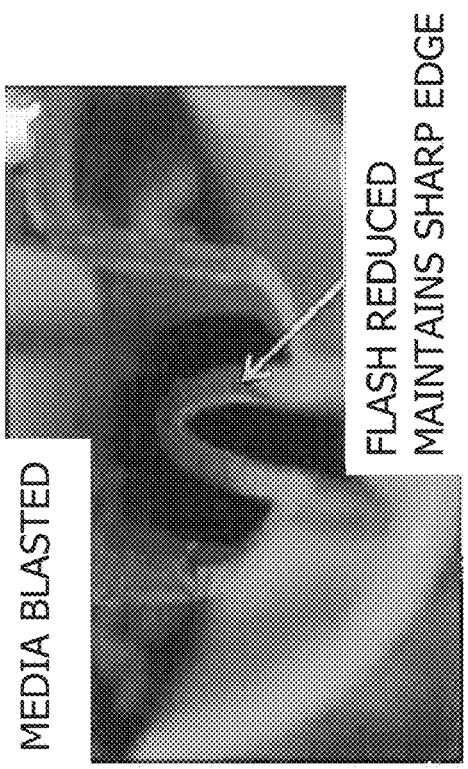
FIG. 13 is a photograph of the piece from FIG. 12 after the flash is reduced or removed by a media blasting process.
Figure 15:
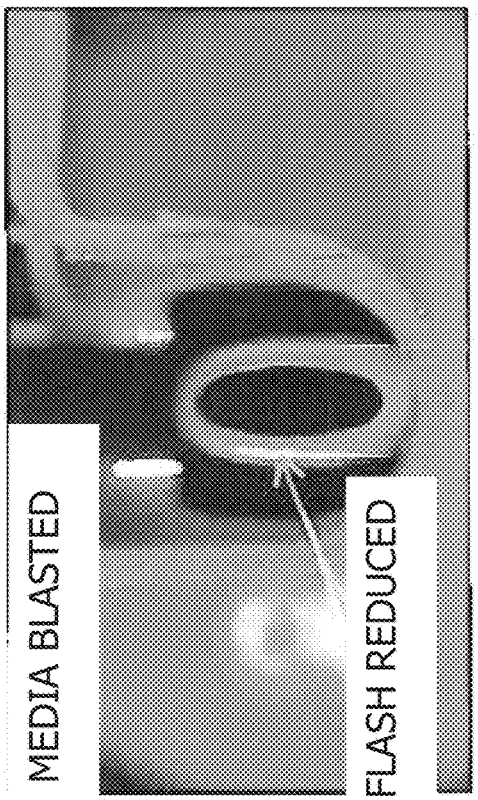
FIG. 15 is a photograph of an end view of the piece from FIG. 14 after the flash is reduced or removed by a media blasting process.

Subsequent to the propelling of the blasting media through all desired ports, the Venturi device, a subcomponent thereof, or the check valve is checked against a preselected performance variable through a test to measure such performance, and if the performance passes, the post-molding manufacturing process is complete. If the performance fails, the process is repeated as many times as necessary to achieve the preselected performance. Photographs of an embodiment of a Venturi device after the flash was removed by media blasting are shown in FIGS. 13 and 15.

Working Example 1

Using the benchtop model described above with respect to FIGS. 18-19 and a TRINCO® 12 cfm carbide nozzle having an outer diameter of 0.75 inch, a lower body housing 106 of the general shape illustrated in FIG. 11 was injection molded from a nylon 6 polymer was subjected to blasting media to remove flash within the motive outlet and the discharge inlet and to modify the discharge inlet to have a corner radius. For this example, aluminum oxide having a nominal grit of 150 was selected as the blasting media and was propelled into the lower body housing 106 by a supply pressure of about 63 psi for about 6-8 seconds. At these parameters, the flash was quickly removed and the desired corner radius was formed. Thereafter, the lower body housing 106 was cleaned by blowing clean, ionized pressure air through the passageway 144.

Then, the lower body housing 106 was sealingly connected to an upper housing 104 to form a Venturi device, and tested for its effectiveness at evacuating a vacuum canister, i.e., how quickly it evacuated the canister) and compared to such a Venturi device that was not modified using a post-molding media blasting method. The data is presented below in Table 1 for various stages of post-molding media blasting processing of the part. The evacuation time was determined under the same operating conditions for each trial.

TABLE 1

| Trial | Venturi device | Evacuation time (sec) |
| --- | --- | --- |
| 1 | No post-molding media blasting | 22.1 |
| 2 | Post-molding media blasting introduced through the motive inlet only | 16.5 |
| 3 | Post-molding media blasting introduced through the motive inlet and through the discharge exit | 15.7 |

Figure 9:
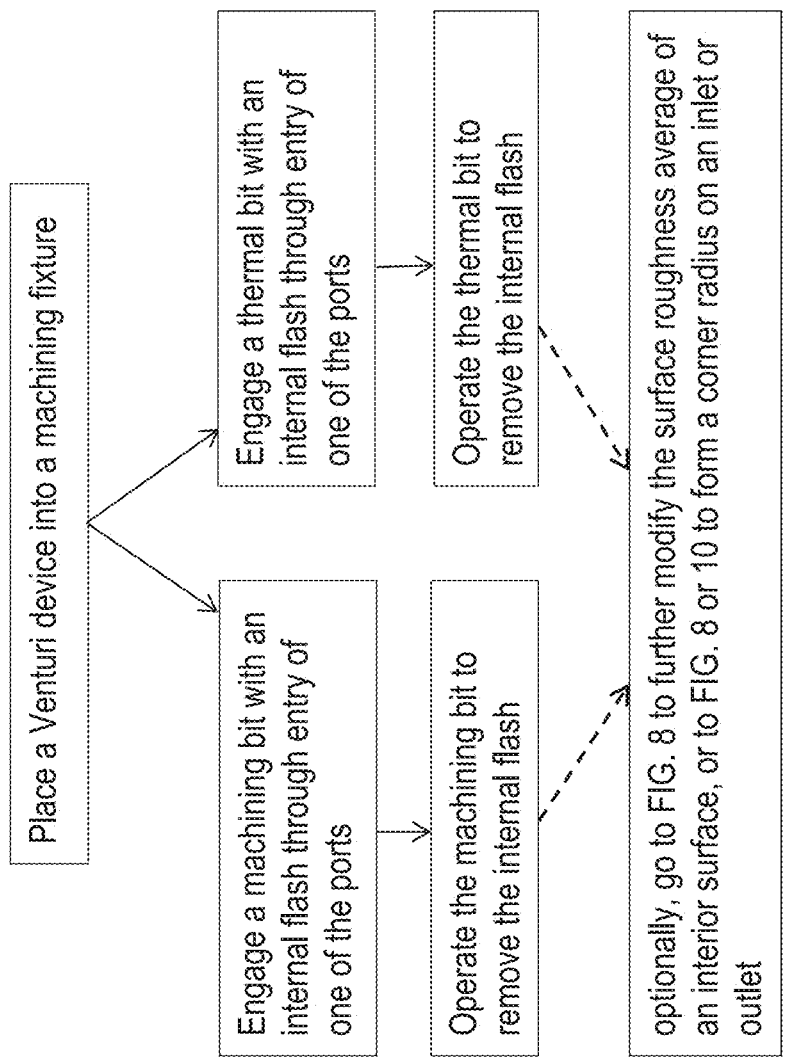
FIG. 9 is a flowchart representing methods of post-molding, machining or thermally removing flash from various embodiments of Venturi devices.
Figure 10:
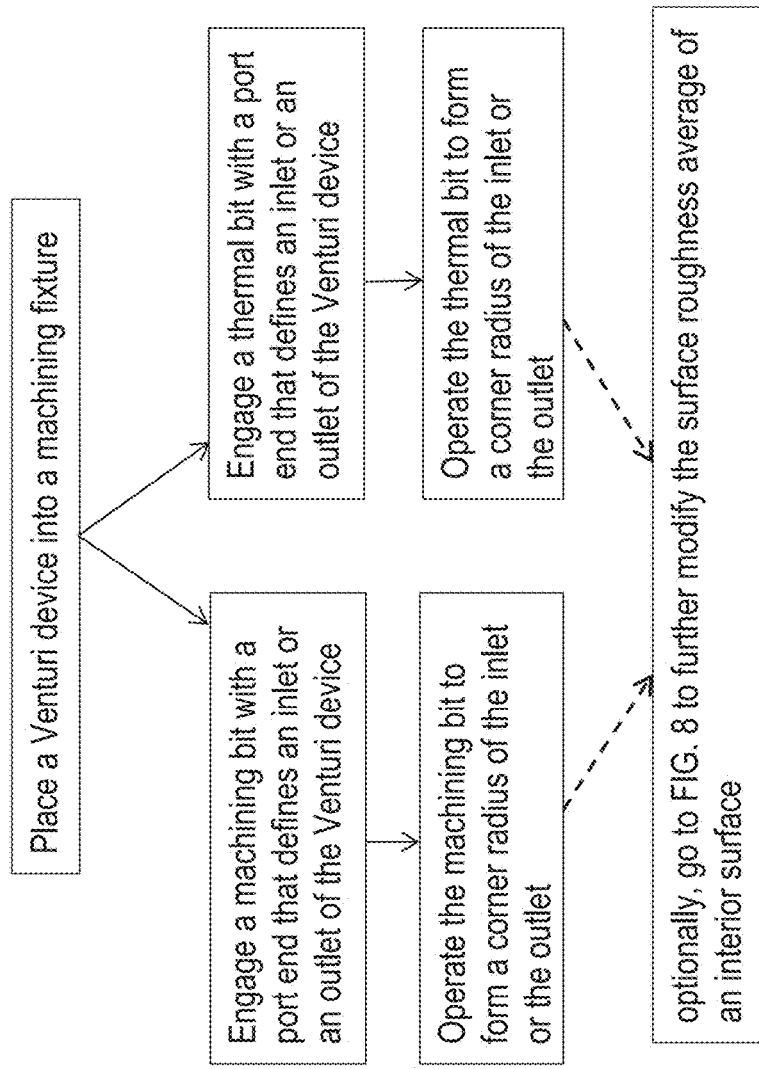
FIG. 10 is a flowchart representing methods of post-molding, machining or thermally forming a corner radius of an inlet or outlet of various embodiments of Venturi devices.

Referring now to FIG. 9, other methods of removing flash from the interior surface of the Venturi device, the subcomponent thereof, or the check valve are illustrated. The methods include placing the Venturi device, the subcomponent thereof, or the check valve into a machining fixture to hold the piece during the post-molding process, engaging a machining bit or a thermal bit with a port end of the piece that defines an inlet or an outlet of the piece, and operating the machining bit or thermal bit to remove the flash. Once this is complete, the piece may optionally be placed into the media blasting machine and processed according to FIG. 8 and the discussion above to modify the surface roughness average on an interior surface thereof and/or to form a corner radius on an inlet or outlet thereof. In another embodiment, once the process of FIG. 9 is complete to remove the flash, the piece may be processed according to FIG. 10, where the same or a different machining bit or thermal bit is reintroduced into a port end that defines an inlet or an outlet of the piece, engaged and operated to form a corner radius of the inlet or outlet.

The advantage of each of the various embodiments herein is that the noise generated, typically from turbulent flow through the device and the operation of the Venturi portion and/or the check valves, is reduced. This is beneficial to a user who expects a quiet operating system.

Having described the invention in detail and by reference to preferred embodiments thereof, it will be apparent that modifications and variations are possible without departing from the scope of the invention which is defined in the appended claims.

The invention claimed is:

1. A method for post-mold processing a Venturi device, the method comprising:
   providing a molded Venturi device having a body defining a Venturi gap between an outlet end of a converging motive passageway and an inlet end of a diverging discharge passageway, the outlet end defining a motive exit having flash extending radially inward and the inlet end defining a discharge inlet having flash extending radially inward;
   positioning the molded Venturi device with an inlet end of the converging motive passageway facing a blasting nozzle; and
   propelling blasting media into a motive inlet of the Venturi device for six to eight seconds to remove the flash in the motive exit and in the discharge inlet and modify the interior surface of the discharge inlet to form a corner radius in a range of 0.05 mm to 1 mm.

2. The method of claim 1, wherein the motive inlet is circularly shaped and the motive exit is elliptically shaped.

3. The method of claim 2, further comprising rotating the Venturi device about a central longitudinal axis that runs through the motive inlet, the motive exit, the Venturi gap, and the discharge inlet during the propelling of the blasting media.

4. The method of claim 1, wherein the blasting nozzle is part of a continuous feed blasting system, and positioning the Venturi device comprises placing the motive inlet a pre-selected distance apart from the blasting nozzle, wherein substantially all the blasting media is received within the converging motive passageway.

5. The method of claim 4, wherein the continuous feed blasting system comprises a reservoir of blasting media and a dust collector for particles less than 150 grit.

6. The method of claim 1, wherein the blasting nozzle defines a nozzle exit having a diverging cone, diverging toward the Venturi device.

7. The method of claim 1, wherein the blasting nozzle is part of a closed feed media blasting system, and positioning includes inserting a nozzle exit of the blasting nozzle within the motive inlet of the Venturi device.

8. The method of claim 1, further comprising positioning a secondary blasting nozzle facing a suction port of the body, and propelling blasting media into the Venturi device through the suction port.

9. The method of claim 8, wherein propelling blasting media occurs first through the motive inlet and subsequent thereto through the suction port.

10. The method of claim 8, wherein propelling blasting media occurs simultaneously through the motive inlet and the suction port.

11. The method of claim 1, wherein the blasting media comprises a metal oxide.

12. The method of claim 11, wherein the metal oxide is aluminum oxide.

13. The method of claim 1, wherein the blasting media comprises one or more of glass, metal, ceramic, polymer, plant matter, ice, or solid carbon dioxide.

14. The method of claim 1, wherein the corner radius is in a range of 0.1 mm to 0.35 mm.

15. The method of claim 1, wherein the corner radius has a plurality of regions of curvature that together form the entire corner radius, wherein a first region is positioned most proximate the opening defining the discharge inlet and a second region is positioned further inward relative to the central longitudinal axis A into the diverging discharge passageway, and a first length of the first region is smaller than a second length of the second region and the radius of curvature of the first region is greater than the radius of curvature for the second region.

16. The method of claim 1, wherein propelling the blasting media comprises 150 grit or less than 150 grit blasting media at a pressure of 63 psi.

17. The method of claim 16, wherein propelling the blasting media comprises a nozzle having a 0.75 inch outer diameter.

18. A method for post-mold processing a Venturi device, the method comprising:
    providing a molded Venturi device having a body defining a Venturi gap between an outlet end of a converging motive passageway and an inlet end of a diverging discharge passageway, the outlet end defining a motive exit having a flash extending radially inward and the inlet end defining a discharge inlet having a flash extending radially inward;
    positioning the molded Venturi device with an outlet end of the diverging discharge passageway facing a blasting nozzle;
    propelling the blasting media into a motive inlet defined by the converging motive passageway for six to eight seconds at a rate of media flow that removes the flash from the discharge inlet and the motive exit, and modifies the interior surface of the discharge inlet to form a corner radius in a range of 0.05 mm to 1 mm; and
    propelling blasting media into a discharge exit defined by the outlet end of the diverging discharge passageway to remove the flash in the discharge inlet and in the motive exit;
    wherein propelling the blasting media into the discharge exit is before or after propelling the blasting media into the motive inlet.

* * * * *